United States Patent
Iritani

(10) Patent No.: US 6,840,055 B2
(45) Date of Patent: Jan. 11, 2005

(54) AIR CONDITIONER FOR HYBRID VEHICLE

(75) Inventor: Kunio Iritani, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/690,313

(22) Filed: Oct. 21, 2003

(65) Prior Publication Data

US 2004/0168454 A1 Sep. 2, 2004

(30) Foreign Application Priority Data

Oct. 2, 2002 (JP) .................................. 2002-306913

(51) Int. Cl.$^7$ ............................ F25B 49/00; F25B 1/00; F25B 27/00
(52) U.S. Cl. ............................ 62/230; 62/134; 62/236
(58) Field of Search .................. 62/230, 236, 239, 62/244, 133, 134

(56) References Cited

U.S. PATENT DOCUMENTS

| | | | | |
|---|---|---|---|---|
| 6,351,957 B2 | * | 3/2002 | Hara | 62/133 |
| 6,515,448 B2 | | 2/2003 | Iritani et al. | |
| 6,640,562 B2 | * | 11/2003 | Odachi et al. | 62/133 |
| 6,688,122 B2 | * | 2/2004 | Matsuoka | 62/134 |
| 2002/0124580 A1 | * | 9/2002 | Suitou et al. | 62/133 |
| 2004/0045307 A1 | * | 3/2004 | Iwata et al. | 62/228.1 |
| 2004/0069000 A1 | * | 4/2004 | Iritani | 62/230 |

FOREIGN PATENT DOCUMENTS

| | | |
|---|---|---|
| JP | 2000-232799 | 8/2000 |
| JP | 2000-270401 | 9/2001 |

* cited by examiner

*Primary Examiner*—Marc Norman
(74) *Attorney, Agent, or Firm*—Harness, Dickey & Pierce, PLC

(57) ABSTRACT

In an air conditioner for a hybrid vehicle, an air conditioning unit performs air-conditioning operation by electrical power supplied from a battery. When a residual charging degree of the battery becomes equal to or lower than a charging-starting target value, an electrical generator is driven by a vehicle engine so that the battery is charged through the electrical generator. Further, when the battery is in a discharging mode, the control unit decreases an air-conditioning capacity of the air conditioning unit, as compared with that in a charging mode of the battery. Accordingly, a frequency for consuming the engine for charging the battery can be reduced. Therefore, a fuel consumption efficiency can be effectively improved and a total discharge amount of environmental destruction substance contained in exhaust gas of the engine can be effectively reduced.

27 Claims, 14 Drawing Sheets

AIR CONDITIONER FOR HYBRID VEHICLE

CROSS-REFERENCE TO RELATED APPLICATION

This application is related to and claims priority from Japanese Patent Application No. 2002-306913 filed on Oct. 22, 2002, the content of which is hereby incorporated by reference.

BACKGROUND OF THE INVENTION

1. Field of the Invention

The present invention relates to an air conditioner for a hybrid vehicle having an engine and an electrical motor for running the vehicle.

2. Description of Related Art

In a conventional hybrid vehicle disclosed in JP-A-2000-270401, there is provided with an air conditioning unit for performing air-conditioning operation in a passenger compartment by using electrical power supplied from a battery. Further, when a residual charging degree of the battery becomes equal to or lower than a charging-starting target value (target degree), the battery is charged by driving a generator using a vehicle engine. While the vehicle is stopped or runs with a low load, the engine is stopped when the residual charging degree of the battery is higher than the charging target value.

SUMMARY OF THE INVENTION

The present invention is applied to another type of hybrid vehicle which has a motor generator only assisting the engine for running.

It is an object of the present invention to provide an air conditioner for a hybrid vehicle, which effectively improves a fuel consumption efficiency and effectively reduces a total discharge amount of environmental destruction substance contained in exhaust gas of a vehicle engine.

According to an aspect of the present invention, an air conditioner is used for a hybrid vehicle that includes an engine for running the vehicle, an electrical motor for running the vehicle in supplementary, a battery for supplying electrical power to the electrical motor, and a power generator driven by the engine to generate electrical power and to charge the battery. Further, when a residual charging degree of the battery becomes equal to or lower than a target degree (charging-starting target value), the electrical motor is driven by the engine to charge the battery. In the air conditioner, an air conditioning unit performs air-conditioning operation in a passenger compartment of the vehicle by using electrical power supplied from the battery, and a control unit controls operation of the air conditioning unit. Further, when the battery is discharged, the control unit decreases an air-conditioning capacity of the air conditioning unit, as compared with a case where the battery is charged. Therefore, a frequency for consuming the engine for generating power and a frequency for increasing the output power of the engine for generating power can be effectively reduced. Thus, time for which the output power of the engine is consumed for generating power and for charging the battery can be reduced. As a result, fuel consumption efficiency and power generation efficiency can be improved, and a vibration noise and discharge amount of environmental destruction substance contained in exhaust gas at a start of the engine can be effectively reduced.

According to another aspect of the present invention, when an electrical power amount discharged from the battery is equal to or larger than a predetermined value, the control unit decreases the air-conditioning capacity of the air conditioning unit, as compared with a case where the electrical power amount discharged from the battery is smaller than the predetermined value. Alternatively, when a running load of the vehicle is equal to or larger than a predetermined value, the control unit decreases the air-conditioning capacity of the air conditioning unit, as compared with a case where the running load of the vehicle is smaller than the predetermined value. Alternatively, the control unit controls the air-conditioning capacity of the air conditioning unit, based on a power generation state of the power generator. Alternatively, when the vehicle is in an acceleration state, the control unit decreases the air-conditioning capacity of the air conditioning unit, as compared with a case where the vehicle is in a deceleration state, Further, when a power generation efficiency due to the engine is equal to or lower than a predetermined efficiency, the control unit decreases the air-conditioning capacity of the air conditioning unit, as compared with a case where the power generation efficiency due to the engine is higher than the predetermined efficiency. Even in the above-described cases, the fuel consumption efficiency and power generation efficiency can be effectively improved, and the vibration noise and the discharge amount of environmental destruction substance contained in exhaust gas at the start of the engine can be effectively reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
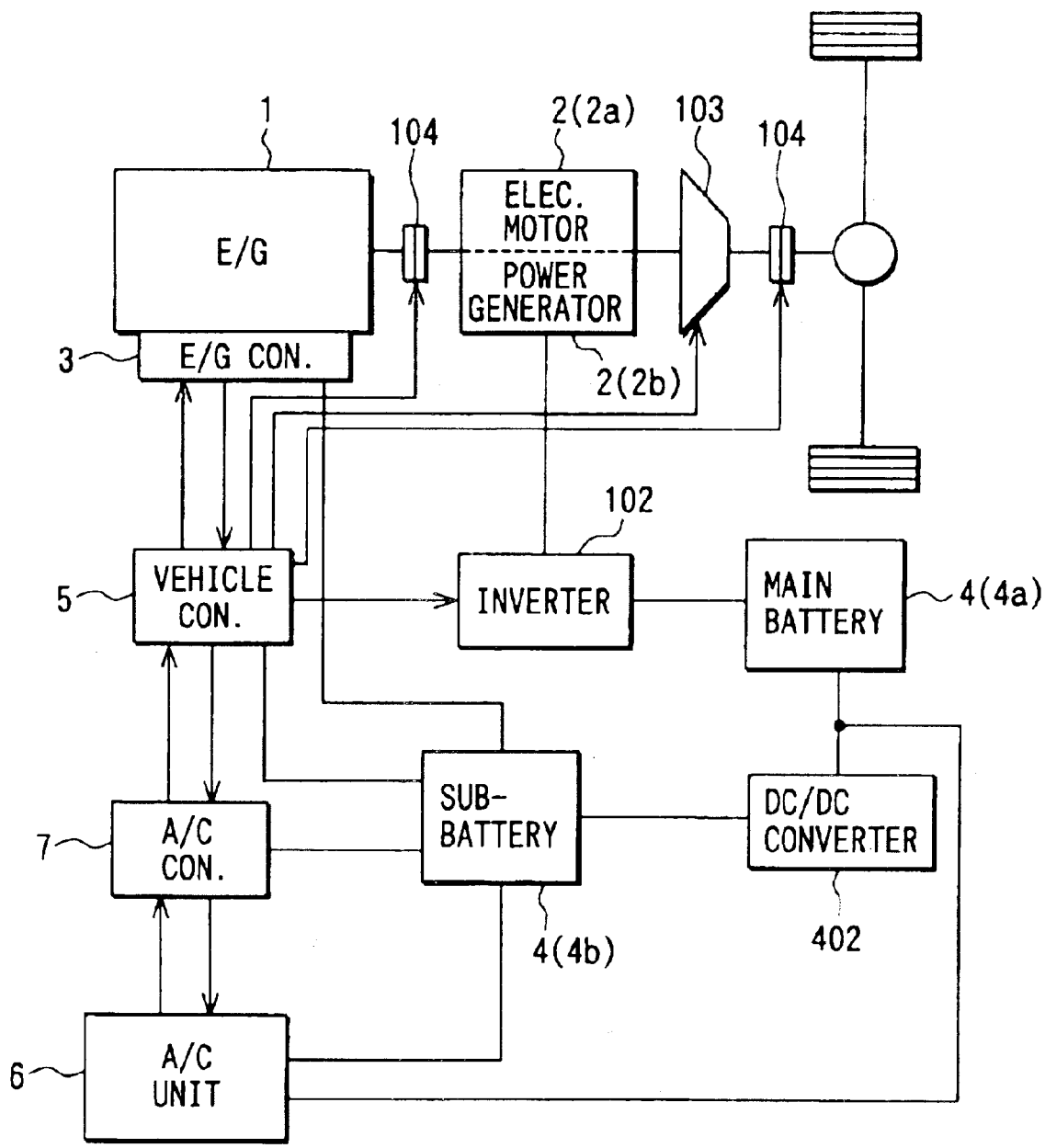
FIG. 1 is a schematic diagram showing a hybrid vehicle on which an air conditioner according to a first embodiment of the present invention is mounted.

A first embodiment of the present invention will be now described with reference to FIGS. 1–7. As shown in FIG. 1, a hybrid vehicle includes an internal combustion engine 1 using gasoline or light oil as a fuel, an electrical motor generator 2, an engine controller 3, a battery 4 and a vehicle controller 5.

The electrical motor generator 2 has functions of an electrical motor 2a (electrical motor function) for running the hybrid vehicle in supplementary and a power generator 2b (power generator function) for generating electrical power and for charging the battery. That is, when electrical power is supplied to the electrical motor generator 2 from the battery 4, the electrical motor generator 2 is operated as the electrical motor 2a for generating motive power. On the other hand, when the electrical motor generator 2 is driven by the engine 1 or the like, the electrical motor generator 2 is operated as the power generator 2b for generating electrical power. In the first embodiment, the electrical motor 2a and the power generator 2b are integrally provided to construct the electrical motor generator 2. However, the electrical motor 2a and the power generator 2b can be independently separately provided. Further, the battery 4 is made of a nickel-hydrogen storage battery, and is constructed with a main battery 4a and a sub-battery 4b.

The engine controller 3 suitably controls an amount of fuel supplied to the engine 1, an ignition timing and the like based on control signals from the vehicle controller 5, so that a rotation speed of the engine 1 and torque thereof can be controlled at target values, and high fuel-combustion efficiency can be obtained in the engine 1. The battery 4 supplies electrical power to the electrical motor generator 2 (motor generator 2b), the engine controller 3, an air conditioner, and the like. The vehicle controller 5 outputs control signals to the engine controller 3 while controlling the electrical motor generator 2 (e.g., inverter control) and a non-stage transmission 103 and a clutch 104.

The following control is basically performed by the vehicle controller 5. First, when the vehicle is stopped, that is, when a vehicle speed is about 0 km/h, the engine 1 is stopped. When the vehicle runs, a driving force generated in the engine 1 is transmitted to driving wheels, except for in a case where the vehicle is in a deceleration state. In the deceleration state of the vehicle, the engine 1 is stopped, and the battery 4 is charged by generating power in the power generator 2b of the electrical motor generator 2. When a running load is large such as in a case where the vehicle starts running, or the vehicle is accelerated or the vehicle is going up in a slope, the electrical motor generator 2 is used as the electrical motor 2b, so that driving force generated in the electrical motor generator 2 is also transmitted to the driving wheels in addition to the driving force generated in the engine 1. In the first embodiment, the running load can be calculated based on a vehicle speed and a pedaled amount of an acceleration pedal.

When a residual charging degree of the battery 4 is equal to or lower than a target degree for starting the charging of the battery 4 while the vehicle is running, the motive power from the engine 1 is transmitted to the electrical motor generator 2, so that the battery 4 is charged by the power generator 2b of the electrical motor generator 2. Further, when the residual charging degree is equal to or lower than the target degree for starting the charging of the battery 4 while the vehicle is stopped, a signal for starting the engine 1 is sent to the engine controller 3. Therefore, the engine 1 is driven, and the motive power is transmitted to the electrical motor generator 2.

In this embodiment, the target value for starting the charging of the battery 4 is a threshold value of the residual charging degree for starting the charging, and is indicated by percentage when a full charging degree is 100. An inverter 102 is a frequency transformer for changing a frequency of voltage or current of electrical power between the electrical motor generator 2 and the main battery 4a. A DC/DC converter 402 is a transformer for changing voltage of electrical power between the main battery 4a and the sub-battery 4b. Further, the non-stage transmission 103 is disposed for changing a deceleration ratio of the driving force generated in the engine 1 and the electrical motor generator 2. The clutch 104 is disposed to interrupt the transmission of the driving force.

The air conditioner includes an air conditioning unit 6 for performing air-conditioning control in a passenger compartment of the vehicle and the air-conditioning controller 7 for controlling components of the air conditioning unit 6. In the first embodiment, the air conditioner is an automatic-controlled air conditioner where the temperature in the passenger compartment is automatically controlled at a temperature set arbitrarily.

Figure 2:
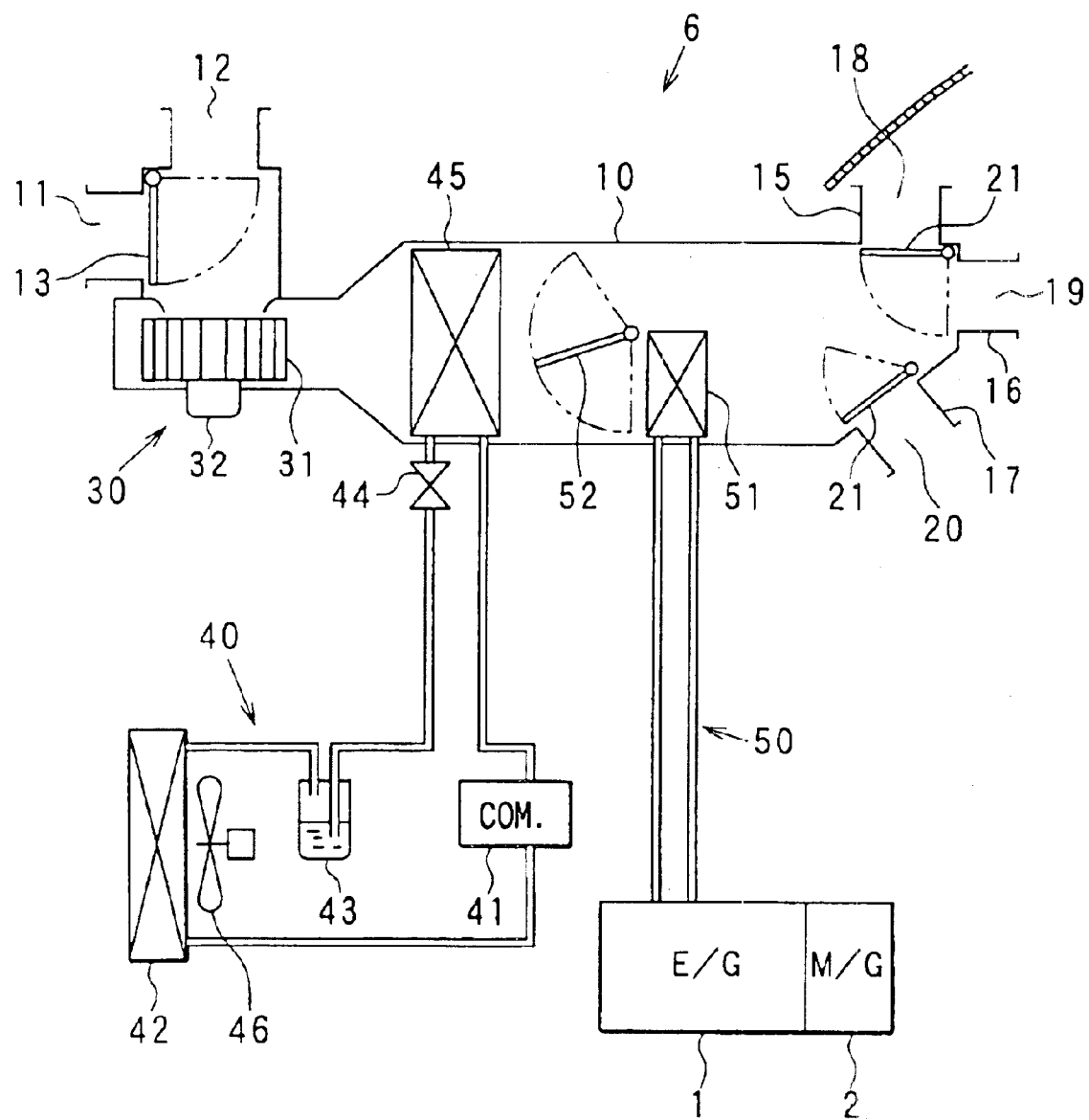
FIG. 2 is a schematic diagram showing an entire structure of the air conditioner according to the first embodiment.

As shown in FIG. 2, the air conditioning unit 6 is disposed in the passenger compartment at a front side. The air conditioning unit 6 includes an air-conditioning duct 10 defining an air passage through which air is introduced into the passenger compartment, a centrifugal type blower 30 for blowing air in the air-conditioning duct 10, a refrigerant cycle system 40, a cooling water circuit 50 and the like. The refrigerant cycle system 40 is disposed to cool air flowing through the air-conditioning duct 10. An inside/outside air switching box, disposed at the most upstream air side of the air-conditioning duct 10, includes an inside air suction port 11 from which inside air inside the passenger compartment is introduced, and an outside air suction port 12 from which outside air outside the passenger compartment is introduced. These suction ports 11, 12 are opened and closed by an inside/outside air switching damper 13, and the inside/outside air switching damper 13 is driven by an actuator 14 such as a servomotor.

At the most downstream air side of the air-conditioning duct 10, a defroster opening portion, a face opening portion and a foot opening portion are provided. A defroster duct 15 is connected to the defroster opening portion, and a defroster air outlet port 18, from which conditioned air is blown toward an inner surface of a vehicle windshield, is provided at the most downstream air end of the defroster duct 15. A face duct 16 is connected to the face opening portion, and a face air outlet port 19, from which conditioned air is blown toward the upper half body of a passenger, is provided at the most downstream air end of the face duct 16. A foot duct 17 is connected to the foot opening portion, and a foot air outlet port 20, from which conditioned air is blown to the foot portion of the passenger, is provided at the most downstream air end of the foot duct 17. Two switching dampers 21, driven by actuators 22, respectively, are rotatably provided for the air outlet ports 18–20. Thus, the switching dampers 21 can switch one air outlet mode among a face mode, a bi-level mode, a foot mode, a foot/defroster mode and a defroster mode.

The blower 30 includes a centrifugal fan 31 rotatably disposed in a scroll case integrated with the air-conditioning duct 10, and a blower motor 32 for driving the centrifugal fan 31. A blown air amount (rotation speed of the centrifugal fan 31) is controlled in accordance with a blower voltage applied to the blower motor 32 through a blower driving circuit 33.

The refrigerant cycle system 40 includes an electrical compressor 41, a condenser 42, a gas-liquid separator 43, an expansion valve 44, an evaporator 45, a cooling fan 46 for blowing outside air to the condenser 42, refrigerant piping for connecting these, and the like. The electrical compressor 41 includes a motor for driving a compression mechanism using an electrical power from the battery 4. The condenser 42 is disposed to condense refrigerant by performing a heat exchange between compressed refrigerant and outside air. The gas-liquid separator 43 is disposed to separate the condensed refrigerant from the condenser 42 into gas refrigerant and liquid refrigerant, so that only the liquid refrigerant flow to a downstream refrigerant side. The expansion valve 44 decompresses and expands the liquid refrigerant from the gas-liquid separator 43, and the evaporator 45 is disposed to perform a heat exchange between the decompressed refrigerant from the expansion valve 44 and air passing through the air-conditioning duct 10. An alternating-current (AC) voltage is applied to the motor of the electrical compressor 41 through an inverter 47, and the inverter 47 adjusts a frequency of the AC voltage based on an instruction from the air-conditioning controller 7. Thus, a rotation speed of the electrical compressor 41 can be continuously changed.

A heater core 51 is disposed in the cooling water circuit 50 in which engine-cooling water (hot water) of the engine 1 is circulated by a water pump (not shown). The heater core 51 performs an heat exchange between the engine-cooling water and air so that air passing through the heater core 51 is heated. The heater core 51 is disposed in the air-conditioning duct 10 at a downstream air side of the evaporator 45 so as to partly cross the air passage in the air-conditioning duct 10. An air mixing damper 52, driven by an actuator 53 such as a servomotor, is rotatably disposed at an upstream air side of the heater core 51. The air mixing damper 52 adjusts a ratio of an air amount passing through the heater core 51 and an air amount bypassing the heater core 51, so as to adjust a temperature of air to be blown into the passenger compartment.

Next, a control system of the first embodiment will be described with reference to FIGS. 1, 3 and 4. Into the air-conditioning controller 7, communication signals from the vehicle controller 5, switch signals from plural switches provided on a control panel 60 in the passenger compartment, and sensor signals from plural sensors are input.

Figure 4:
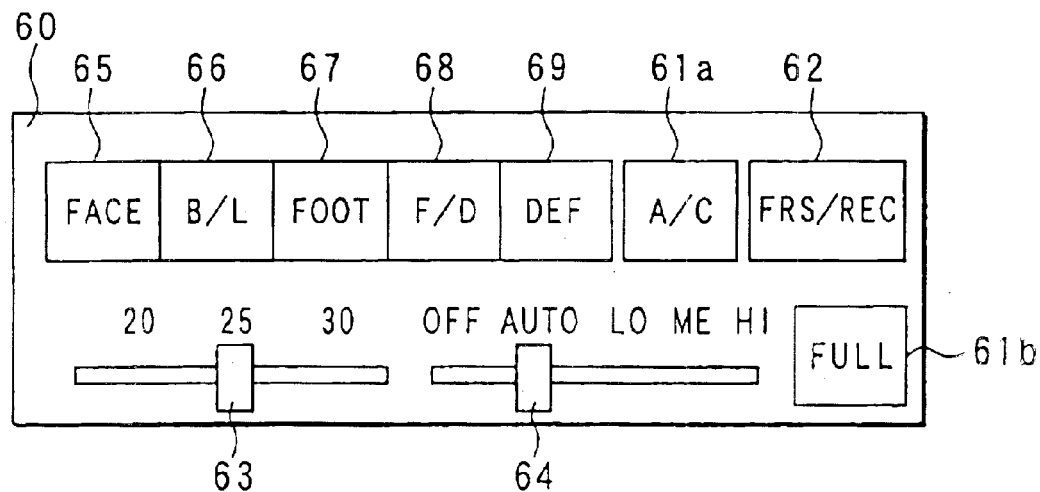
FIG. 4 is a plan view showing a control panel shown in FIG. 3.

As shown in FIG. 4, the plural switches provided on the control panel 60 includes an air-conditioning switch 61a, a full switch 61b, a suction-port changing over switch 62, a temperature setting lever 63, an air amount changing over switch 64, an air-outlet mode changing over switch and the like. The air-conditioning switch 61a is disposed to start and stop an operation of the refrigerant cycle system 40 (electrical compressor 41). The full switch 61b selects any one of a full mode where an air-conditioning control is performed while an amenity in the passenger compartment is mainly improved, and an economy mode where the air-conditioning control is performed while fuel-economical property (fuel consumption efficiency) is mainly improved. The suction-port changing over switch 62 switches an air suction mode, and the temperature setting lever 63 sets a temperature in the passenger compartment at a requested temperature. The air-amount changing over switch 64 switches an amount of air blown by the centrifugal fan 31, and the air-outlet mode changing over switch switches an air outlet mode. The air-outlet mode changing over switch include a face switch 65 for setting a face mode, a bi-level switch 66 for setting a bi-level mode, a foot switch 67 for setting a foot mode, a foot/defroster switch 68 for setting a foot/defroster mode and a defroster switch 69 for setting a defroster mode.

Figure 3:
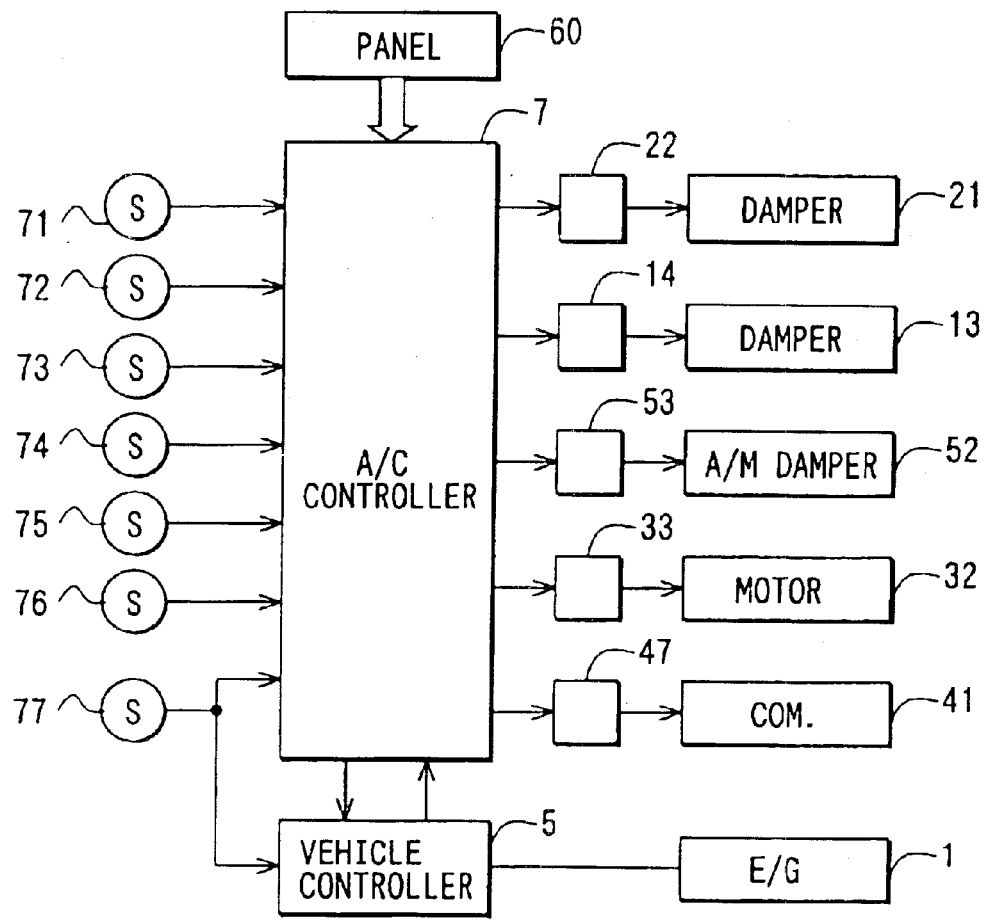
FIG. 3 is a block diagram showing a control unit of the air conditioner according to the first embodiment.

As shown in FIG. 3, the plural sensors include an inside air temperature sensor 71, an outside air temperature sensor 72, a solar radiation sensor 73, an evaporator air suction temperature sensor 74, an evaporator air blow temperature sensor 75, a water temperature sensor 76, a vehicle speed sensor 77 and the like. The inside air temperature sensor 71 detects an air temperature in the passenger compartment, and the outside air temperature sensor 72 detects an air temperature outside the passenger compartment. The solar radiation sensor 73 detects an amount of sunlight radiated into the passenger compartment. The evaporator suction air temperature sensor 74 detects a temperature (evaporator suction temperature) TIN of air flowing into the evaporator 45, and the evaporator air blow temperature sensor 75 detects a temperature of air immediately after flowing through the evaporator 45. The water temperature sensor 76 detects a temperature of cooling water flowing into the heater core 51, and the speed sensor 77 detects a vehicle speed. Thermistors can be used as the inside air temperature sensor 71, the outside air temperature sensor 72, the evaporator suction air temperature sensor 74, the evaporator air blow temperature sensor 75 and the water temperature sensor 76, among the above sensors.

The air-conditioning controller 7 includes a microcomputer (not shown) composed of a central processing unit (CPU), a read only memory (ROM), a random access memory (RAM) and the like. Sensor signals from the sensors 71–77 are converted from analog signals to digital signals by an input circuit (not shown) within the air-conditioning controller 7. Thereafter, the digital signals are inputted into the microcomputer.

Figure 5:
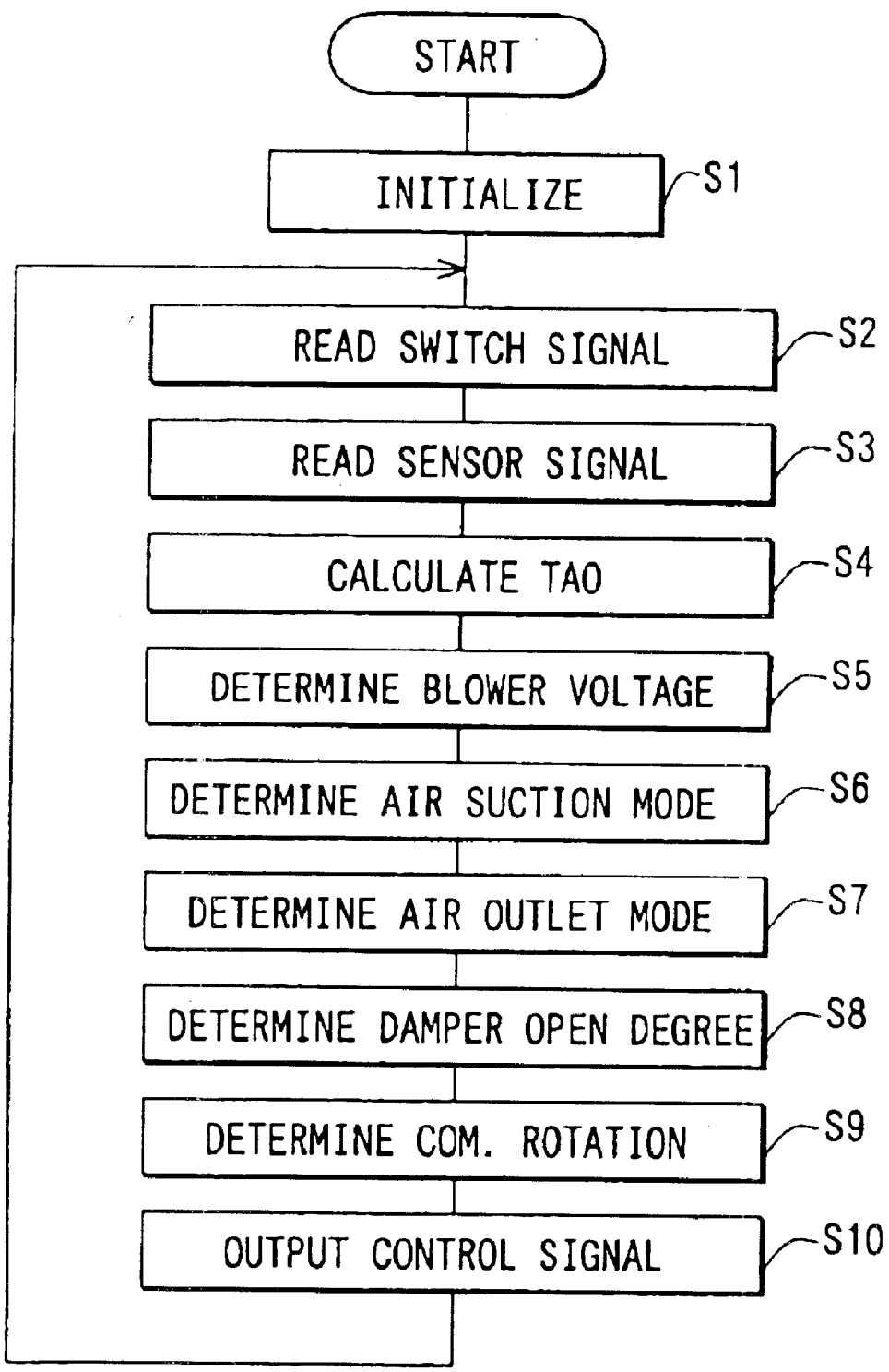
FIG. 5 is a flow diagram showing basic control processes of the air conditioning controller (A/C controller) shown in FIG. 1.
Figure 6:
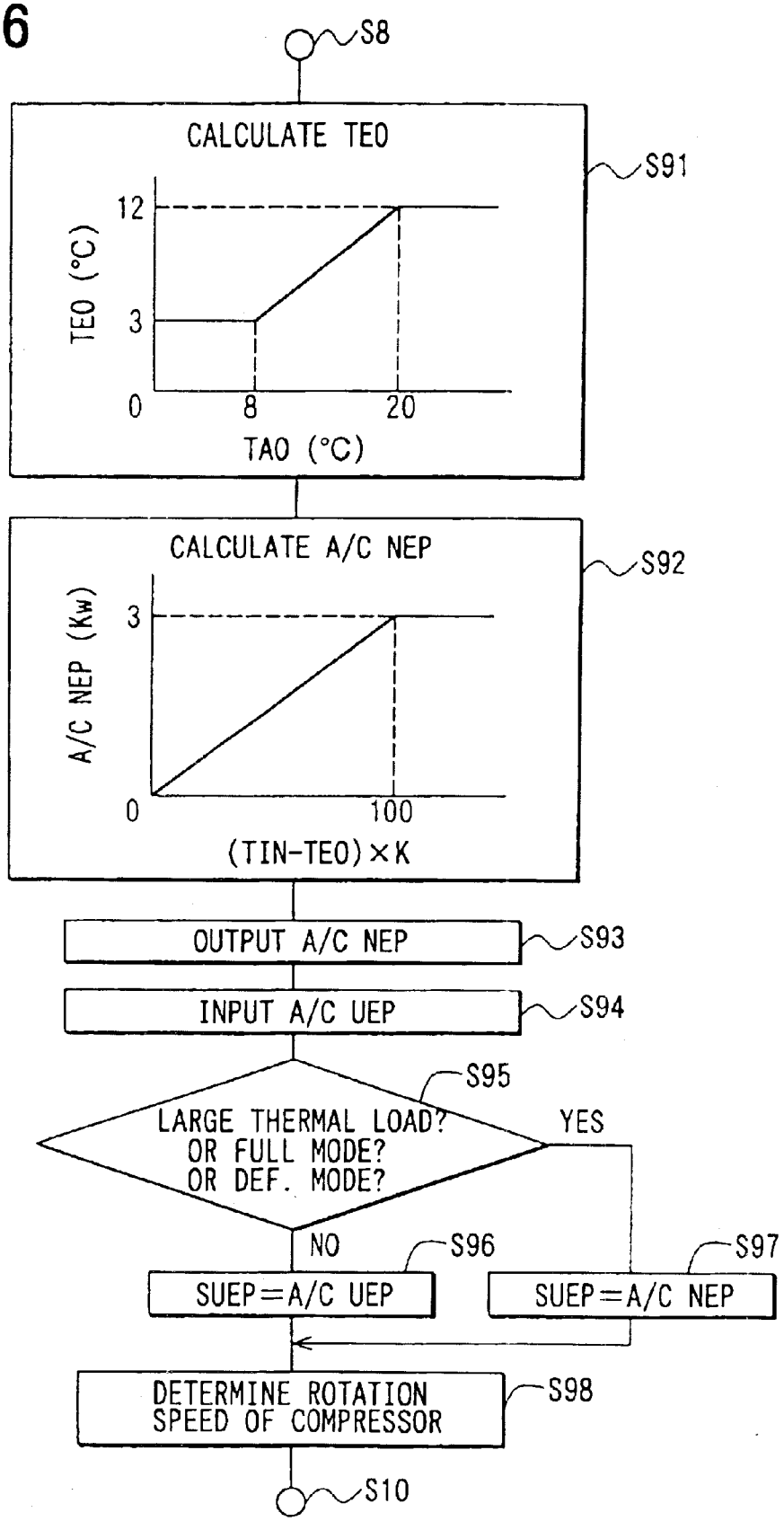
FIG. 6 is a flow diagram showing a detail control at step S9 in FIG. 5, according to the first embodiment.

Next, control processes of the air-conditioning controller 7 will be described with reference to FIGS. 5 and 6. When the ignition switch is turned on, a direct-current electrical power is applied to the air-conditioning controller 7, and a control routine shown in FIG. 5 is started. First, initial setting is performed at step S1. Next, at step S2, the air-conditioning controller 7 reads the switch signals from the switches such as the temperature setting lever 63. At step S3, the air-conditioning controller 7 reads the sensor signals, from the inside air temperature sensor 71, the outside air temperature sensor 72, the solar radiation sensor 73, the evaporator air suction temperature sensor 74, the evaporator air blow temperature sensor 75, the water temperature sensor 76 and the speed sensor 77, converted from analog signals to digital signals.

At step S4, a target temperature TAO of air to be blown into the passenger compartment is calculated based on the following formula (1) beforehand stored in the ROM.

$$TAO = Kset \times Tset - KR \times TR - KAM \times TAM - KS \times TS + C \quad (1)$$

Wherein, Tset indicates a temperature set by the temperature setting lever 63, TR indicates an inside air temperature detected by the inside air temperature sensor 71, TAM indicates an outside air temperature detected by the outside air temperature sensor 72, and TS indicates a solar radiation amount detected by the solar radiation sensor 73. Kset, KR, KAM and KS indicate gain coefficients, respectively, and C indicates a correction constant.

At step S5, a blower voltage (applied to the blower motor 32) corresponding to the target air temperature TAO is determined using a characteristic view beforehand stored in the ROM. Specifically, as the target air temperature TAO becomes lower than the set temperature or higher than that, the blower voltage is made higher (air amount is increased). On the other hand, as the target air temperature TAO becomes close to the set temperature, the blower voltage is made lower.

Next, at step S6, an air suction mode corresponding to the target air temperature TAO is determined using the characteristic view beforehand stored in the ROM. Specifically, when the target air temperature TAO is low, an inside air circulation mode is selected. When the target air temperature TAO is high, an outside air introduction mode is selected. At step S7, an air outlet mode corresponding to the target air temperature TAO is determined using the characteristic view beforehand stored in the ROM. Specifically, when the target air temperature TAO is low, the foot mode is selected. As the target air temperature TAO becomes higher, the air outlet mode is selected from the foot mode to the face mode through the bi-level mode.

At step S8, an open degree of the air mixing damper 52 is determined in accordance with the target air temperature TAO, the evaporator air temperature detected by the evaporator air blow temperature sensor 75, the cooling water temperature detected by the water temperature sensor 76 and the like. At step S9, a sub-routine shown in FIG. 6 is called, and the rotation speed of the electrical compressor 41 is determined when the air-conditioning switch 61a is turned on. At step S10, control signals are outputted to the actuators 14, 22, 53, the blower circuit 33 and the inverter 47 so as to obtain each of control states calculated or determined at steps S4–S9.

Next, operation of the air conditioner will be now described. While air blown by the blower 30 in the air duct 10 flows through the evaporator 45 in the refrigerant cycle system 40, air is heat-exchanged with refrigerant and is cooled. Here, the rotation speed of the electrical compressor 41 is controlled by the air-conditioning controller 7, so that an amount of refrigerant, flowing in the refrigerant cycle system 40, is controlled and the cooling performance of the refrigerant cycle system 40 is adjusted.

When air cooled in the evaporator 45 flows through the heater core 51 in the cooling water circuit 50, air is heat-exchanged with engine-cooling water and is heated. In addition, the ratio of air flowing through the heater core 51 and air bypassing the heater core 51 is adjusted by an operation position of the air mixing damper 52. Thus, the conditioned air adjusted at a predetermined temperature is blown from one or two of the air outlet ports 18–20 into the passenger compartment.

Next, detail control of the rotation speed of the electrical compressor 41 will be now described with reference to FIG. 6. At step S91, a target evaporator air temperature TEO blown from the evaporator 45, corresponding to the target air temperature TAO, is calculated. At this step, when the full mode is selected by the full switch 61b, the target evaporator air temperature TEO is determined based on a characteristic view shown at step S91. On the other hand, when the economy mode is selected by the full switch 61b, the target evaporator air temperature TEO is set higher than that in the full mode.

At step S92, an air-conditioning necessary electrical power (A/C NEP), originally required in the air-conditioning unit 6 for reducing the evaporator suction air temperature TIN to the target evaporator air temperature TEO, is calculated using a constant K. The constant K is determined by the target evaporator air temperature TEO, the evaporator suction air temperature TIN and the air amount blown from the blower 30. Here, as the rotation speed of the electrical compressor 41 becomes higher, cooling performance of the refrigerant cycle system 40 is improved. Therefore, as a temperature difference between the evaporator suction air temperature TIN and the target evaporator air temperature TEO increases, the air-conditioning necessary electrical power NEP is increased.

At step S93, the air-conditioning necessary electrical power NEP calculated at step S92 is output to the vehicle controller 5. Next, at step S94, an air-conditioning usable electrical power (A/C UEP, described later in detail) calculated by the vehicle controller 5 is inputted to the air-conditioning controller 7.

At step S95, it is determined whether an air-conditioning heat load (thermal load) is large, or it is determined whether the full mode is selected, or it is determined whether the defroster mode is selected. The air-conditioning heat load becomes large, at a time immediately after starting a heating operation or a cooling operation (warming up time or cooling down time), or at a time where an outside air temperature is high while the outside air introduction mode is selected.

At step S95, when the air-conditioning heat load is determined to be high, or when the full mode is determined to be selected, or when the defroster mode is determined to be selected, the determination result is "YES". In this case, the control process proceeds to step S97, and a set usable electrical power SUEP is set at the air-conditioning necessary electrical power (A/C NEP). The set usable electrical power SUEP is a control value of electrical power usable for the air conditioning unit 6. That is, in this case, the air-conditioning capacity of the air conditioning unit 6 is not reduced. Next, at step S98, the rotation speed of the electrical compressor 41 is determined based on the set usable electrical power SUEP. At step S95, when the air-conditioning heat load is not determined to be high, when the full mode is not selected, and when the defroster mode is not selected, the determination result is "NO". In this case, the control process proceeds to step S96, and the set usable electrical power SUEP is set at the air-conditioning usable electrical power (A/C UEP). Thereafter, at step S98, the rotation speed of the electrical compressor 41 is determined based on the set usable electrical power SUEP. In the first embodiment, generally, the usable electrical power UEP for the air-conditioning unit 6 is set to be equal to or smaller than the necessary electrical power NEP. Therefore, the air-conditioning capacity of the air conditioning unit 6 is reduced at step S96.

Next, the control processes related to the air-conditioning control, in the vehicle controller 5, will be now described with reference to FIG. 7. Within the vehicle controller 5, a microcomputer (not shown) composed of a CPU, a ROM, a RAM and the like is provided. A sensor signal from the speed sensor 77 is converted from an analog signal to a digital signal by an input circuit (not shown) within the vehicle controller 5. Thereafter, the digital signal is inputted into the microcomputer of the vehicle controller 5.

Figure 7:
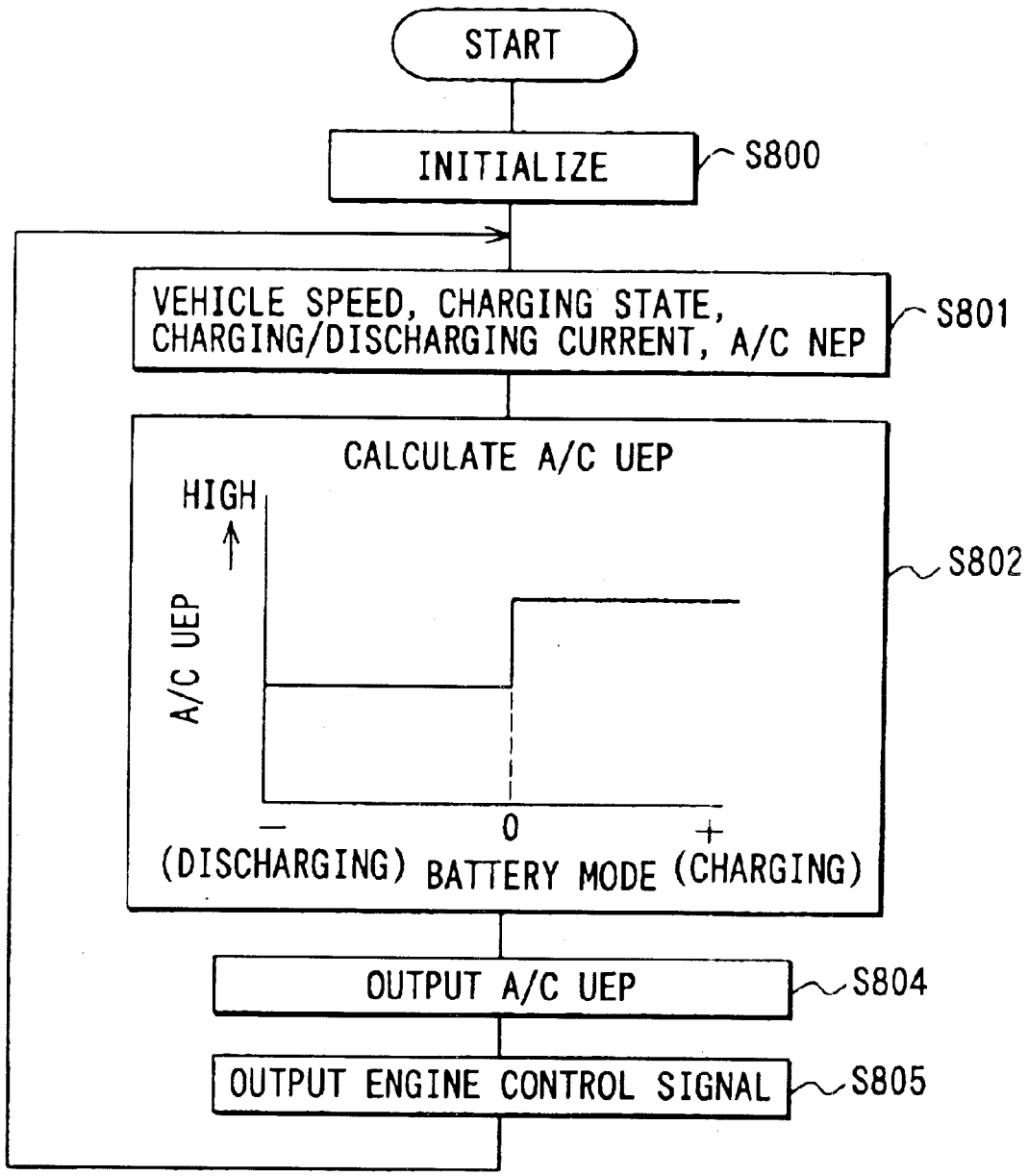
FIG. 7 is a flow diagram showing control processes related to air-conditioning control in the air controller shown in FIG. 1.

When the ignition switch is turned on, direct-current electrical power is supplied to the vehicle controller 5, a control routine shown in FIG. 7 is started, and initial setting is performed at step S800. At step S801, the vehicle speed is calculated based on the signal from the speed sensor 77, and a charging state (e.g., residual charging degree) or a discharging state of the battery 4 is calculated based on a voltage of the battery 4. Further, the air-conditioning necessary electrical power A/C NEP calculated by the air-conditioning controller 7 is inputted to the vehicle controller 5.

At step S802, the air-conditioning usable electrical power A/C UEP is determined based on a battery mode of the main battery 4a, such as a charging mode and a discharging mode. Specifically, when the electrical power is discharged from the main battery 4a, that is, when a discharging current from the main battery 4a is detected, the discharging mode is determined as the battery mode. When the discharging mode of the battery 4 (4a) is determined, the air-conditioning usable electrical power A/C UEP (i.e., air conditioning capacity) is set smaller than that in the charging mode. Then, at step S804, the air-conditioning usable electrical power A/C UEP calculated at step S802 is output to the air-conditioning controller 7. In this case, a large part of the electrical power used in the air conditioner is a consumption power of the electrical compressor 41. At step S805, a control signal is output to the engine controller 3.

According to the first embodiment of the present invention, in the discharging mode, the air-conditioning capacity of the air conditioning unit 6, that is, the air-conditioning usable electrical power A/C UEP is set lower, as compared with that in the charging mode for charging the battery 4. Accordingly, in the discharging mode of the battery 4 (4a), the consumption power consumed in the air conditioner becomes smaller, the frequency and time for using the output power of the engine 1 for the electrical generation can be reduced. In addition, the frequency of increasing the rotation speed of the engine 1, for charging the battery 4, can be also reduced. Thus, fuel consumption efficiency of the engine 1 can be improved, and a total discharge amount of environmental destruction substance contained in exhaust gas of the vehicle engine 1 can be effectively reduced.

In this embodiment, the engine 1 stops when the vehicle stops. However, when the residual charging degree of the battery 4 becomes lower than the target degree, it is necessary to start the engine 1 for power-generating. Generally, in a case where the load of the engine 1 is low, the engine efficiency is low. When the engine 1 operates only for power-generating, the load of the engine 1 is low, and a power generation efficiency (a ratio of a power generation amount to a fuel consumption amount in the engine 1) becomes lower. When the engine 1 starts while the vehicle stops, the power generation efficiency is reduced, and the fuel consumption amount in the engine 1 is increased. As a result, the discharge amount of environmental destruction substance contained in the exhaust gas of the engine 1 is increased.

However, in the first embodiment of the present invention, in the discharging mode, the air-conditioning capacity of the air conditioning unit 6, that is, the air-conditioning usable electrical power A/C UEP is set lower as compared with that in the charging mode. Therefore, in the discharging mode of the battery 4, the consumption power consumed in the air conditioner becomes smaller. Therefore, a frequency and time for charging (electrical generation) in a low load of the engine 1 can be reduced. Further, while the vehicle stops, the frequency for using the engine 1 for the power generation can be effectively reduced. Thus, fuel consumption efficiency of the engine 1 and power generation efficiency can be improved, and vibration noise and the exhaust amount of environmental polluting matter at the engine start time can be reduced.

When the power generation efficiency is calculated, the unit of the power generation amount can be set at W, and the unit of the fuel consumption amount can be set at g/sec. In this case, the unit of the power generation efficiency is J/g.

(Second Embodiment)

Figure 8:
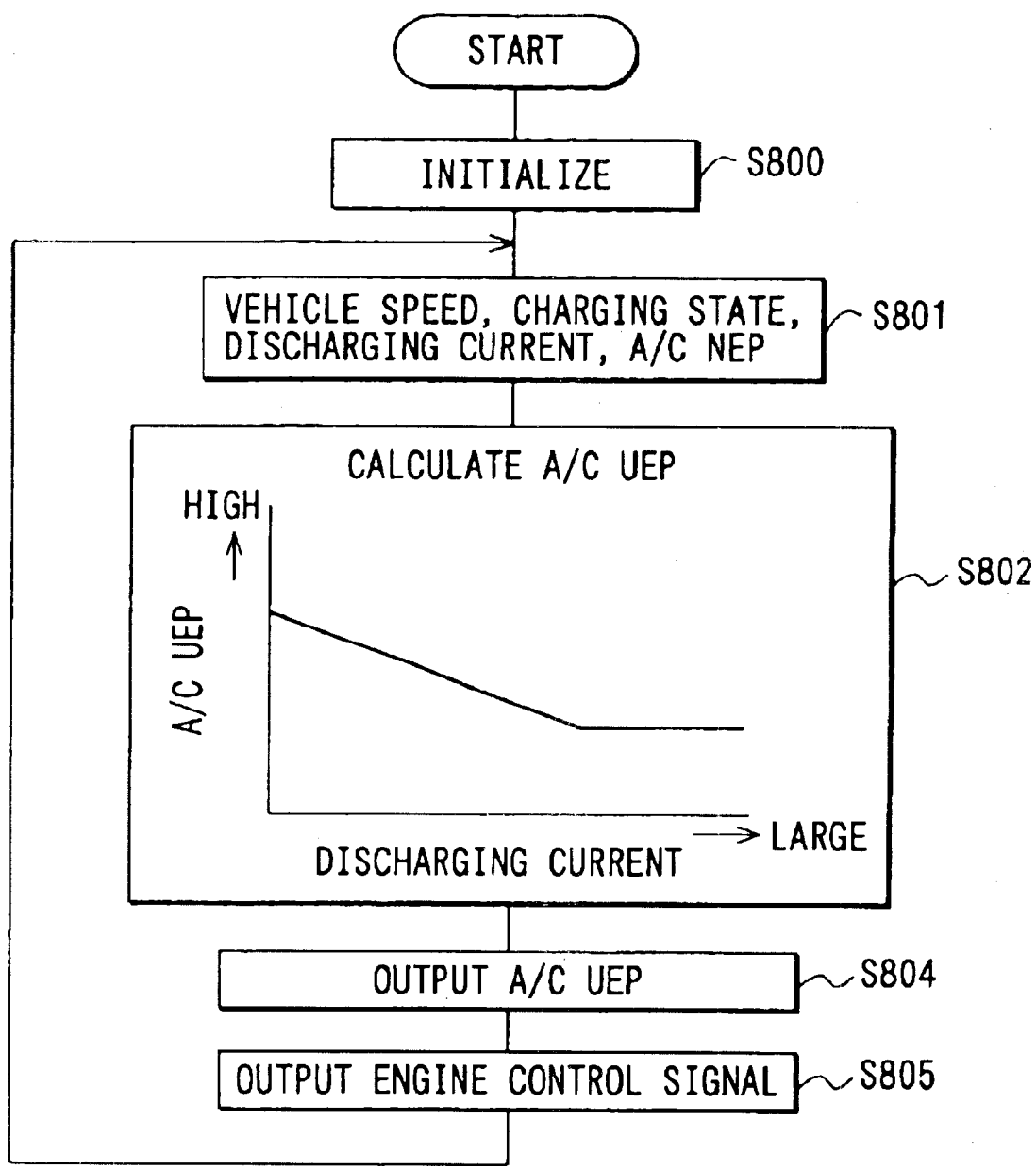
FIG. 8 is a flow diagram showing control processes of an air conditioner according to a second embodiment of the present invention.

The second embodiment of the present invention will be now described with reference to FIG. 8. In the above-described first embodiment of the present invention, the air-conditioning usable electrical power A/C UEP in the discharging mode of the battery 4 (4a) is set smaller than that in the charging mode of the battery 4 (4a). However, in the second embodiment, as shown in FIG. 8, at step S802, when the discharging current (i.e., electrical power) of the main battery 4a is equal to or larger than a predetermined value, the air-conditioning usable electrical power A/C UEP is set lower than that in a case where the discharging current (i.e., electrical power) of the main battery 4a is smaller than the predetermined value. In the second embodiment, the other parts are similar to those of the above-described first embodiment.

Accordingly, in the second embodiment, the frequency and time for using the output power of the engine 1 for the electrical generation can be reduced. Thus, similarly to the first embodiment, fuel consumption efficiency of the engine 1 and power generation efficiency can be improved, and vibration noise and the exhaust amount of environmental polluting matter at the engine start time can be reduced.

(Third Embodiment)

Figure 9:
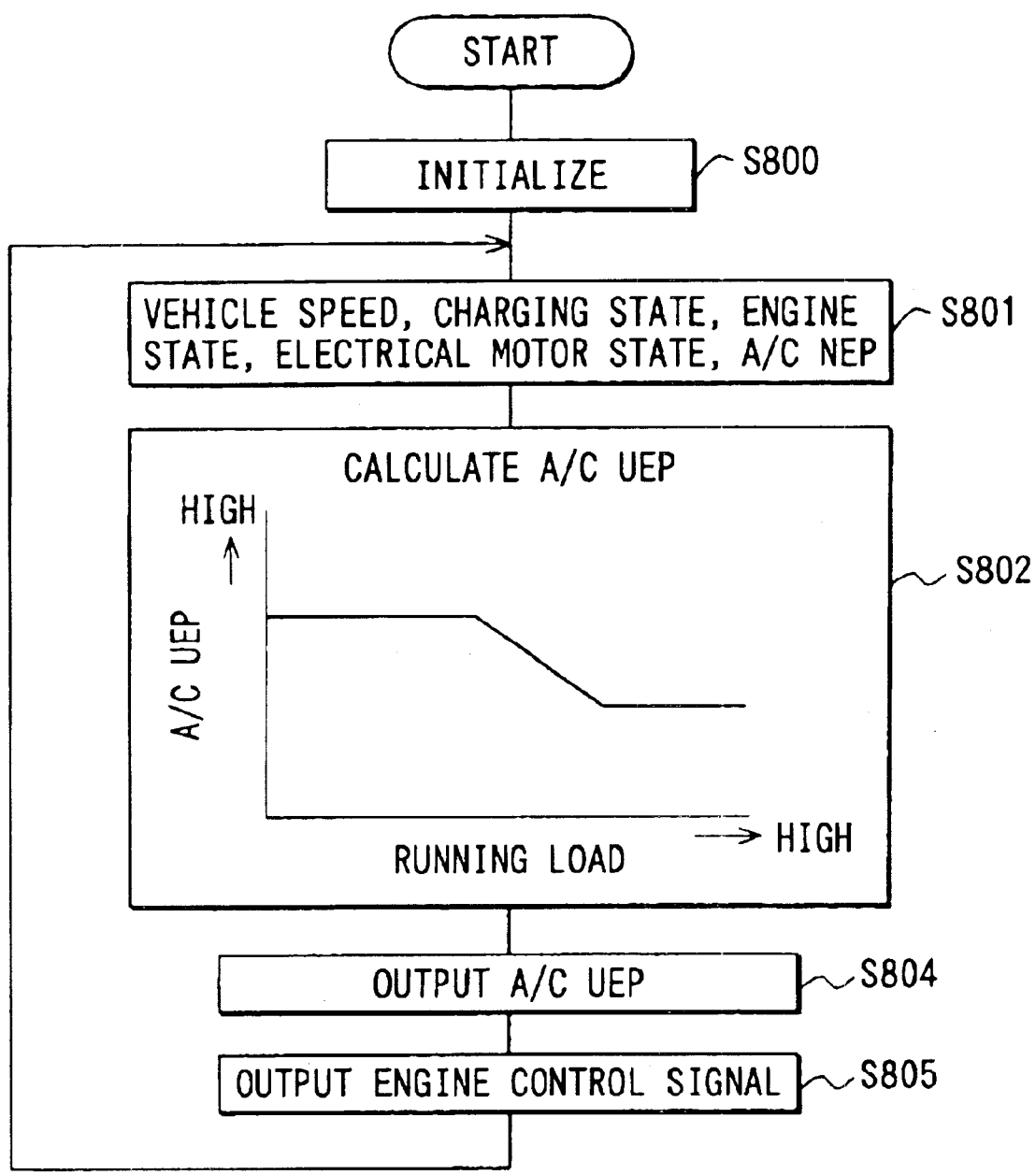
FIG. 9 is a flow diagram showing control processes of an air conditioner according to a third embodiment of the present invention.

The third embodiment of the present invention will be now described with reference to FIG. 9. In the third embodiment of the present invention, at step S801, a vehicle running state, that is a vehicle running load is detected. Further, at step S801, the charging state of the battery 4, the engine state, the motor state and the air-conditioning necessary electrical power A/C NEP are input. Then, as step S802 in FIG. 9, the air-conditioning usable electrical power A/C UEP is calculated based on the vehicle running load. Specifically, when the vehicle running load is equal to or larger than a predetermined value, the air-conditioning usable electrical power A/C UEP is set lower than that in a case where the vehicle running load is smaller than the predetermined value. In the third embodiment, the other parts are similar to those of the above-described first embodiment.

Accordingly, in the third embodiment of the present invention, the frequency and time for using the output power of the engine 1 for the electrical generation can be reduced. Thus, similarly to the first embodiment, the fuel consumption efficiency of the engine 1 and power generation efficiency can be improved, and vibration noise and the exhaust amount of environmental polluting matter at the engine start time can be reduced.

(Fourth Embodiment)

The fourth embodiment of the present invention will be now described with reference to FIG. 10. In the fourth embodiment, at step S801 in FIG. 10, the running speed of the vehicle is calculated based on the signal from the vehicle speed sensor 77, the battery charging state (i.e., residual charging degree) of the battery 4 is calculated based on the voltage of the battery 4, and an operation state of the engine 1 is determined based on an input engine rotation speed. Further, the air-conditioning necessary electrical power A/C NEP is input at step S801.

Figure 10:
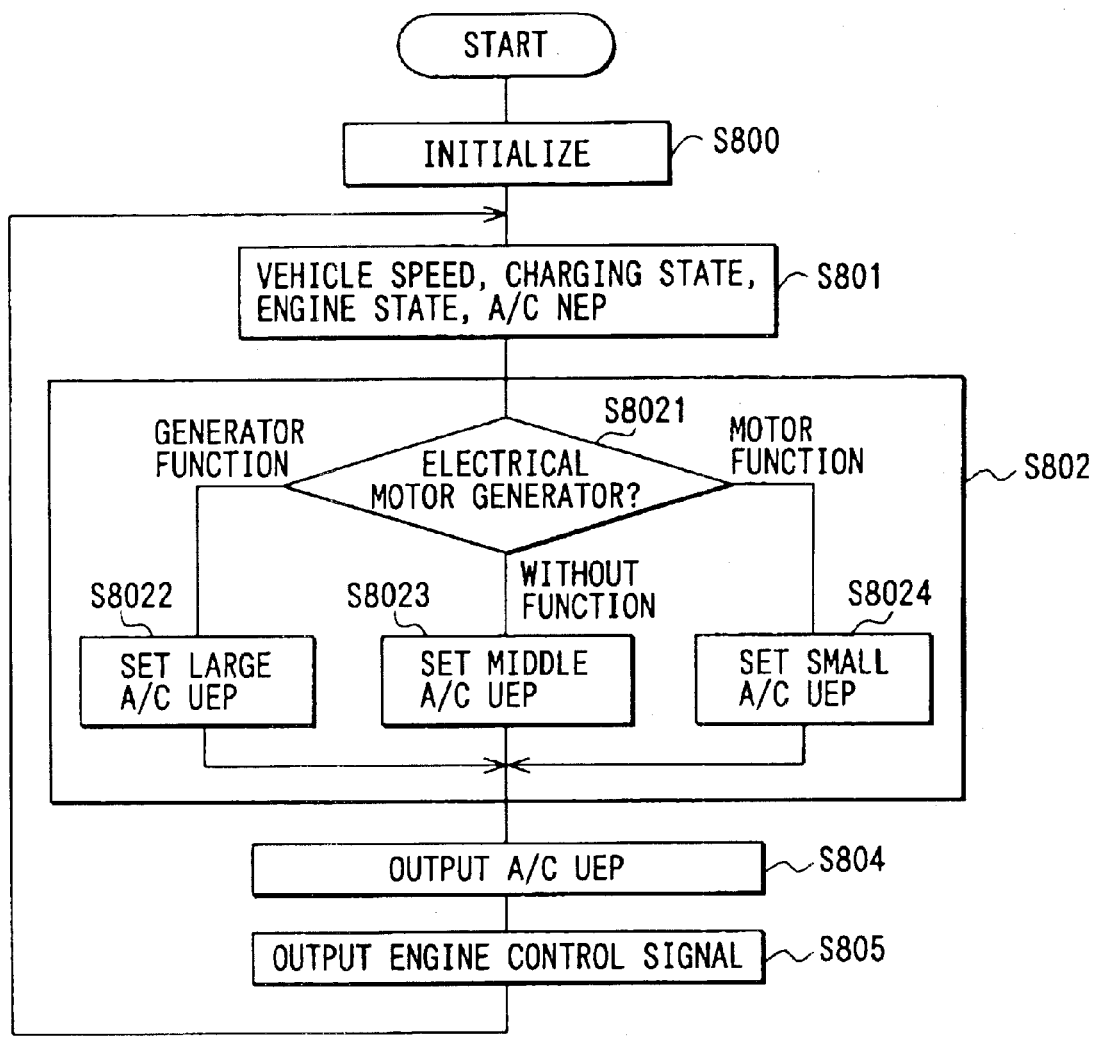
FIG. 10 is a flow diagram showing control processes of an air conditioner according to a fourth embodiment of the present invention.

Then, at step S802 in FIG. 10, the air-conditioning usable electrical power A/C UEP is determined based on an operation state (e.g., power generation state, motor generation state, stop state) of the electrical motor generator 2. Specifically, at step S8021, the operation state of the electrical motor generator 2 is determined. When the electrical motor generator 2 has the power generator function, the air-conditioning usable electrical power A/C UEP is set smaller at step S8024. When the electrical motor generator 2 has the electrical motor function, the air-conditioning usable electrical power A/C UEP is set larger at step S8023. Further, when the electrical motor generator 2 does not have the power generator function and the electrical motor function, the air-conditioning usable electrical power A/C UEP is set at a middle valve at step S8023 between the small value at step S8024 and the large value at step S8022. In the fourth embodiment, the other parts are similar to those of the above-described first embodiment.

Accordingly, in the fourth embodiment of the present invention, the frequency and time for using the output power of the engine 1 for the electrical generation can be reduced. Thus, similarly to the first embodiment, fuel consumption efficiency of the engine 1 and power generation efficiency can be improved, and vibration noise and the exhaust amount of environmental polluting matter at the engine start time can be reduced.

(Fifth Embodiment)

The fifth embodiment of the present invention will be now described with reference to FIG. 11. In the fifth embodiment, at step S801 in FIG. 11, the running state of the vehicle including an acceleration and a deceleration of the vehicle is calculated based on the signal from the vehicle speed sensor 77, the battery charging state (i.e., residual charging degree) of the battery 4 is calculated based on the voltage of the battery 4, and the air-conditioning necessary electrical power A/C NEP is input at step S801.

Figure 11:
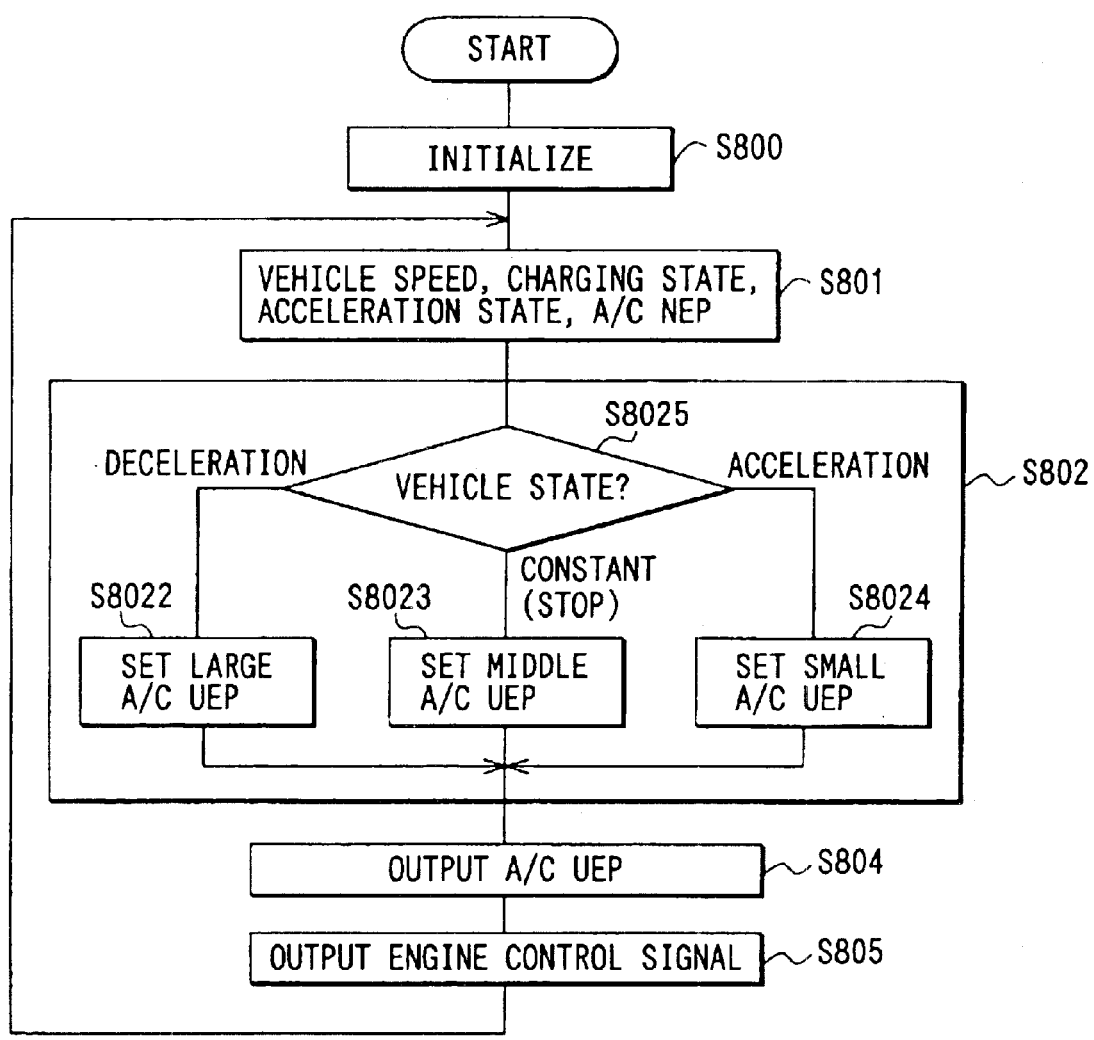
FIG. 11 is a flow diagram showing control processes of an air conditioner according to a fifth embodiment of the present invention.

Then, at step S802 in FIG. 11, the air-conditioning usable electrical power A/C UEP is determined based on an operation state (e.g., acceleration state, deceleration state, constant speed state, stop state) of the vehicle. Specifically, at step S8025, the operation state of the vehicle is determined. When the vehicle is in the acceleration state, the air-conditioning usable electrical power A/C UEP is set smaller at step S8024. When the vehicle is in the deceleration state, the air-conditioning usable electrical power A/C UEP is set larger at step S8022. Further, when the vehicle runs by a constant speed or is stopped, the air-conditioning usable electrical power A/C UEP is set at a middle valve at step S8023 between the small value at step S8024 and the large value at step S8022. That is, in the fifth embodiment, when the vehicle is in the acceleration state, the air-conditioning usable electrical power A/C UEP is set smaller than that in the deceleration state of the vehicle. In the fourth embodiment, the other parts are similar to those of the above-described first embodiment.

Accordingly, in the fifth embodiment of the present invention, the frequency and time for using the output power of the engine 1 for the electrical generation can be reduced. Thus, similarly to the first embodiment, the fuel consumption efficiency of the engine 1 and the power generation efficiency can be improved, and the vibration noise and the exhaust amount of environmental polluting matter at the engine start time can be reduced.

(Sixth Embodiment)

The sixth embodiment of the present invention will be now described with reference to FIG. 12. At step S801, the vehicle speed is calculated based on the signal from the speed sensor 77, and the charging state (e.g., residual charging degree) of the battery 4 is calculated based on the voltage of the battery 4. Further, the rotation speed of the engine 1 is inputted to the vehicle controller 5 to determine the operation state of the engine 1 (e.g., whether the engine 1 is driven or not), and the air-conditioning necessary electrical power A/C NEP calculated by the air-conditioning controller 7 is inputted to the vehicle controller 5.

At step S802, the target degree (target value for starting the charging) is calculated based on the air-conditioning necessary electrical power (A/C NEP) and the operation state of the engine 1. When the vehicle is stopped, the target degree is set at 30% as indicated by the line "a" shown in FIG. 7. When the vehicle is in running, the charging target value gradually becomes higher from 50% to 80% as the air-conditioning necessary electrical power A/C NEP increases, as indicated by the line "b" shown in FIG. 7. When the charging state (residual charging degree) becomes equal to or lower than the target degree, the electrical motor generator 2 is driven by the engine 1 so as to generate electrical power, and the battery 4 is charged by the electrical motor generator 2.

At this time, in a vehicle where an additional power generator is provided separately from the electrical motor generator 2 and is driven by the engine 1 through a clutch (motive-power interrupting device), when the residual charging degree becomes equal to or lower than the target degree, the clutch is made to be in a motive-power transmission state, and the additional power generator generates electrical power so that the battery 4 is charged by the additional power generator. Alternatively, even when the electrical motor generator 2 is not used for running the vehicle, the electrical motor generator 2 may be used for generating electrical power.

Figure 12:
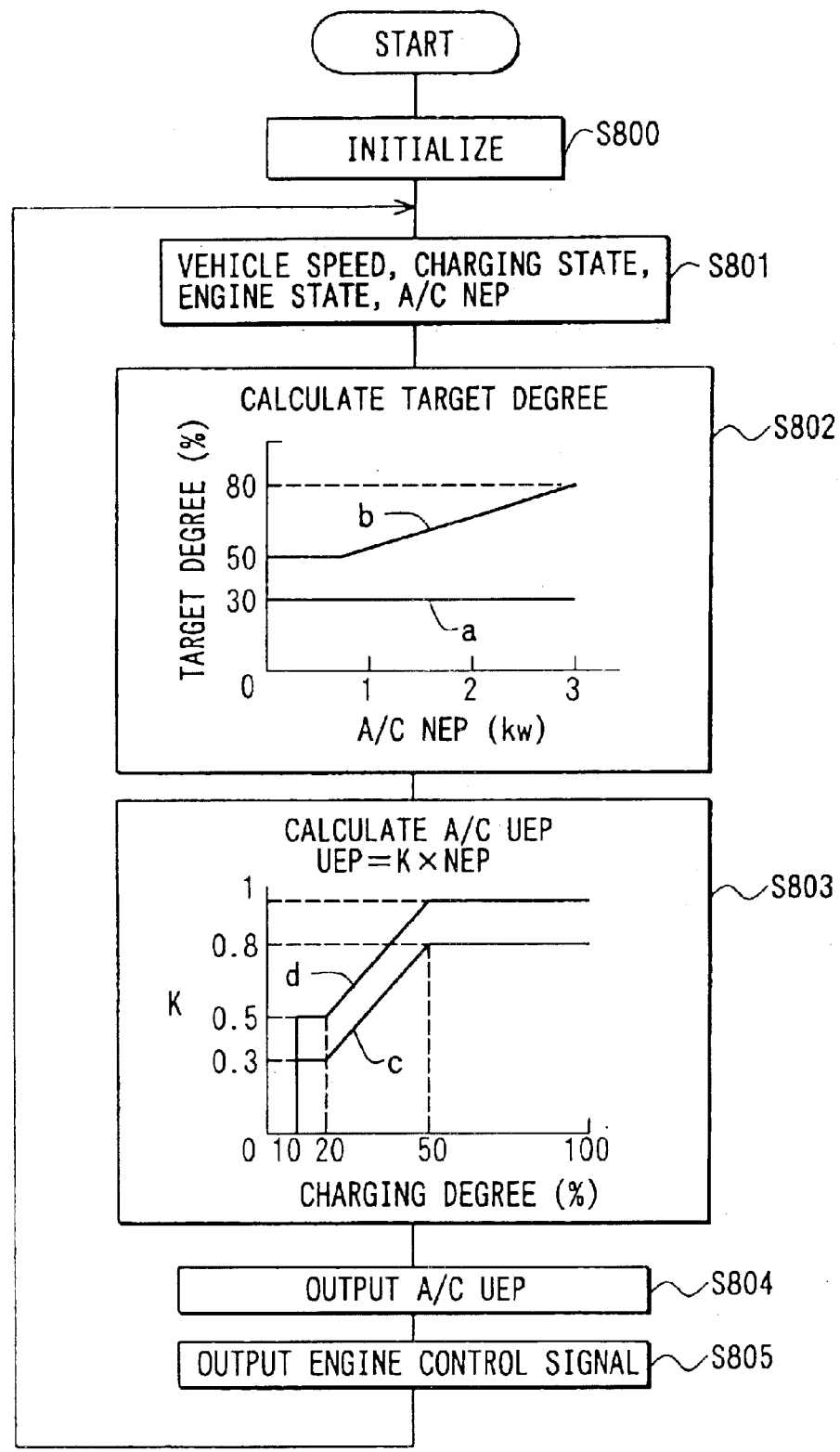
FIG. 12 is a flow diagram showing control processes of an air conditioner according to a sixth embodiment of the present invention.

At step S803 in FIG. 12, the constant K is calculated based on the charging state of the battery 4 and the operation state of the engine 1, and air-conditioning usable electrical power A/C UEP is calculated by multiplying the air-conditioning necessary electrical power NEP by the constant K. While the vehicle is in running, the constant K is changed as indicated by the line "d" shown in FIG. 7. That is, when the residual charging degree is equal to or lower than 10%, the constant K is zero. When the residual charging degree is in a range between 10% and 20%, the constant K is 0.5. When the residual charging degree is in a range between 20% and 50%, the constant K gradually increases as the residual charging degree increases. When the residual charging degree is equal to or larger than 50%, the constant K is set at 1. On the other hand, while the engine 1 is stopped, the constant K is changed as indicated by the line "c" shown in FIG. 7. That is, when the residual charging degree is equal to or larger than 10%, the constant K is set smaller by 0.2 than that when the engine 1 is operated. At step S804, the air-conditioning usable electrical power UEP calculated at step S803 is output to the air-conditioning controller 7. At step S805, a control signal is output to the engine controller 3 so that the charging degree becomes higher than the target degree calculated at step S802. In the sixth embodiment, the other parts are similar to those of the above-described first embodiment.

Accordingly, in the sixth embodiment of the present invention, the frequency and time for using the output power of the engine 1 for the electrical generation can be reduced.

Thus, similarly to the first embodiment, the fuel consumption efficiency of the engine 1 and power generation efficiency can be improved, and vibration noise and the exhaust amount of environmental polluting matter at the engine start time can be reduced.

(Seventh Embodiment)

Figure 13:
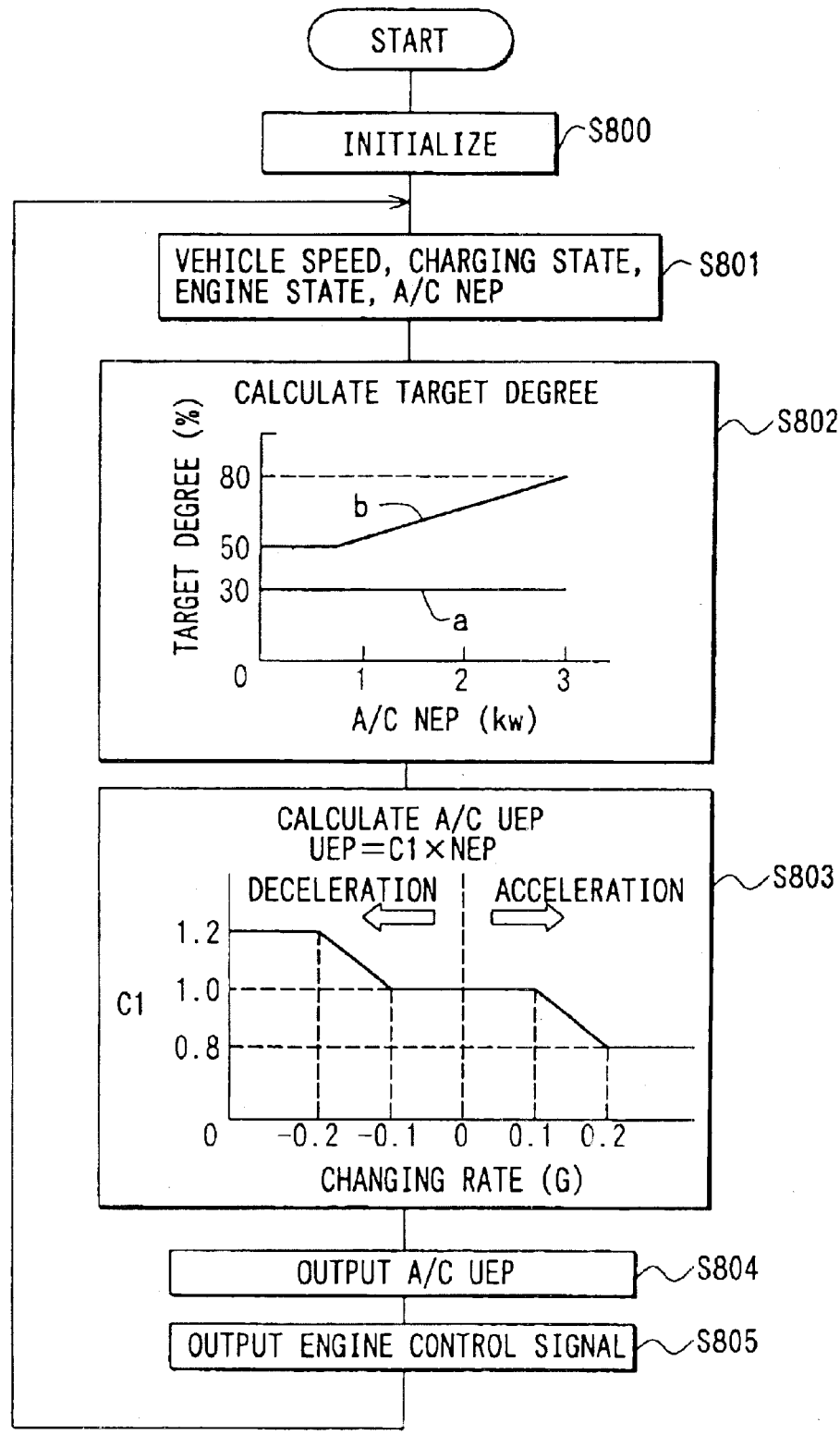
FIG. 13 is a flow diagram showing control processes of an air conditioner according to a seventh embodiment of the present invention.

The seventh embodiment of the present invention will be now described with reference to FIG. 13. The seventh embodiment is a modification of the above-described sixth embodiment. In the seventh embodiment, at step S803 in FIG. 13, it is determined whether or not the vehicle is in an acceleration state or in a deceleration state based on the vehicle speed, and a coefficient C1 is calculated from a vehicle-speed changing rate (positive or negative acceleration) obtained based on the vehicle speed. In addition, the air-conditioning usable electrical power A/C UEP is calculated by multiplying the coefficient C1 and the air-conditioning necessary electrical power NEP together.

Specifically, in the acceleration operation of the vehicle, the coefficient C1 is 1.0 when the acceleration is in a range of 0–0.1 G, the coefficient C1 is gradually reduced until 0.8 as the acceleration increases in an acceleration range between 0.1 G and 0.2 G, and the coefficient C1 is 0.8 when the acceleration is equal to or larger than 0.2 G. On the other hand, in the deceleration operation of the vehicle, the coefficient C1 is 1.0 when the deceleration is in a range of 0 and −0.1 G, the coefficient C1 is gradually increased until 1.2 as the deceleration increases in an deceleration range between −0.1 G and −0.2 G, and the coefficient C1 is 1.2 when the deceleration is equal to or larger than −0.2 G.

When the running load of the vehicle is high such as in an acceleration, because a large driving force generates in the electrical motor generator 2, it can be generally estimated that the consumed electrical power becomes larger. According to the seventh embodiment, in the acceleration of the vehicle, the air-conditioning usable electrical power UEP is set lower as compared with that in a constant speed running. Accordingly, it can prevent the electrical power consumed in the whole vehicle from becoming excessive.

On the other hand, the electrical power is generated from the electrical generator by the regenerative braking in the deceleration operation of the vehicle. At step S803*a* in FIG. 13, in the deceleration operation of the vehicle, the air-conditioning usable electrical power UEP can be set higher as compared with that in the constant speed running. Accordingly, the capacity of the air conditioning unit 6 can be set higher when the electrical motor generator 2 has the electrical generating function, and amenity in the passenger compartment can be improved.

In the seventh embodiment, the running load of the vehicle is estimated from the acceleration or the deceleration, and the air-conditioning usable electrical power UEP is set lower in the acceleration of the vehicle. However, the running load of the vehicle can be estimated from the pedaled amount of the accelerator pedal. In this case, the air-conditioning usable electrical power UEP can be set lower as the pedaled amount of the accelerator pedal becomes larger.

Further, when the acceleration or the pedaled amount of the accelerator pedal is larger than a predetermined value, electrical power used for the electrical compressor 41 can be set zero only for a predetermined time period. In this case, after the predetermined time passes, the operation control before the stop of the electrical compressor 41 can be re-started. In the seventh embodiment, the other parts are similar to those of the above-described sixth embodiment.

(Eighth Embodiment)

The eighth embodiment of the present invention will be now described with reference to FIG. 14. In the eighth embodiment, at step S801 in FIG. 10, the running speed of the vehicle is calculated based on the signal from the vehicle speed sensor 77, the battery charging state (i.e., residual charging degree) of the battery 4 is calculated based on the voltage of the battery 4, the engine state is detected, and an electrical-power generation amount of the electrical power generator 2 is detected. Further, the air-conditioning necessary electrical power A/C NEP is input at step S801.

Figure 14:
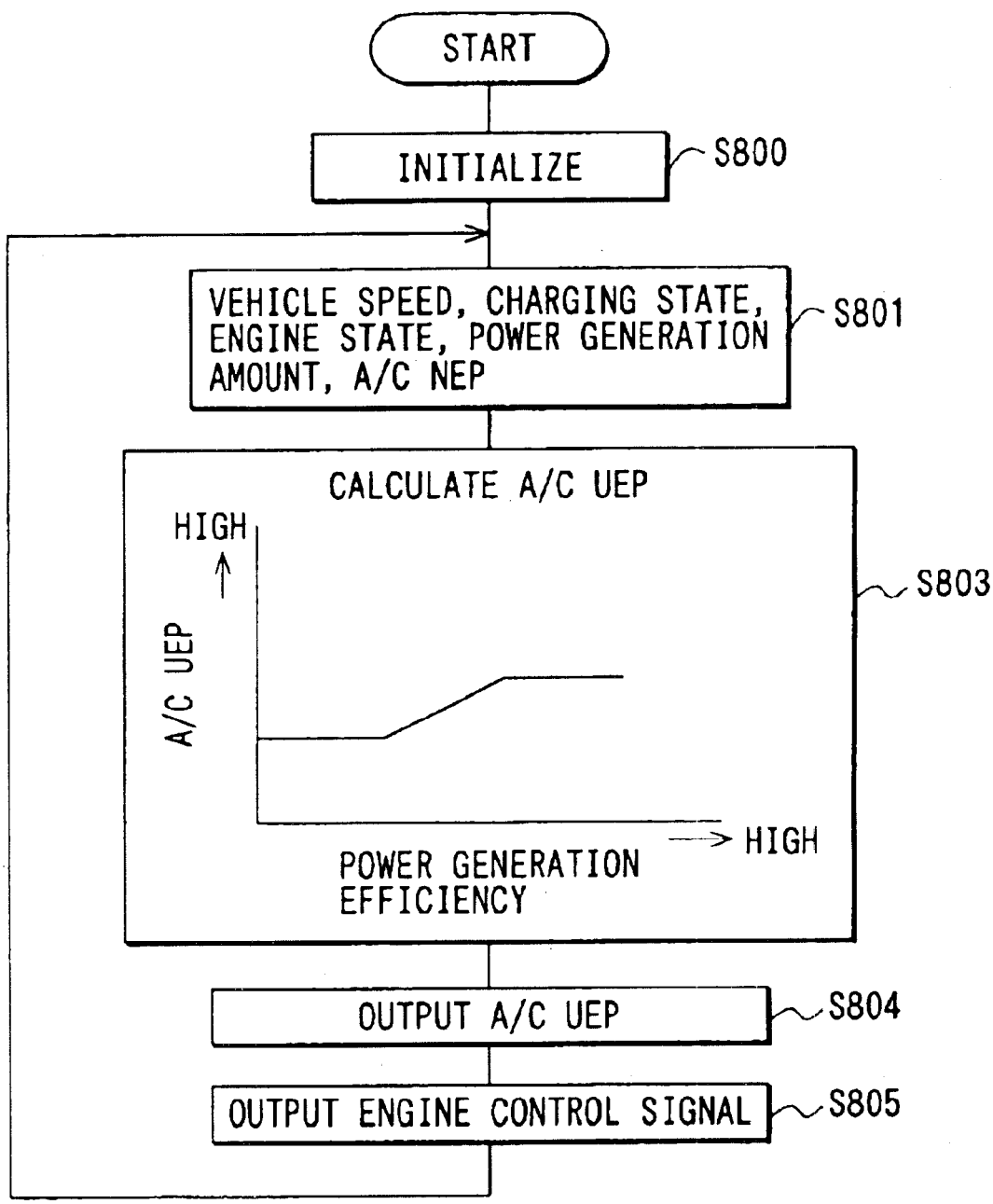
FIG. 14 is a flow diagram showing control processes of an air conditioner according to an eighth embodiment of the present invention.

Then, at step S802 in FIG. 14, the air-conditioning usable electrical power A/C UEP is determined based on the power generation efficiency of the electrical power generator 2 due to the engine 1. Hear, the power generation efficiency is a ratio of the power generation amount of the electrical motor generator 2 to the fuel consumption amount in the engine 1. Generally, when the rotation speed of the engine 1 decreases, the efficiency of the engine 1 decreases, and the power generation efficiency is decreased.

In the eighth embodiment of the present invention, when the power generation efficiency due to the engine 1 is lower than a predetermined efficiency, the air-conditioning usable electrical power A/C UEP is set lower than in a case where the power generation efficiency due to the engine 1 is higher than the predetermined value. That is, when the power generation efficiency due to the engine 1 is lower than the predetermined efficiency, the air conditioning capacity of the air conditioning unit 6 is set lower. In the eighth embodiment, the other parts are similar to those of the above-described first embodiment.

Accordingly, when the power generation efficiency due to the engine 1 is low, the consumption power in the air conditioner can be restricted. Therefore, the frequency for starting the engine only for charging the battery 4 is reduced. In addition, the frequency of increasing the rotation speed of the engine 1, for charging the battery 4, can be also reduced. Thus, the average fuel consumption efficiency in the engine 1 can be improved, and vibration noise and the exhaust amount of environmental polluting matter at the engine start time can be reduced.

(Ninth Embodiment)

Figure 15:
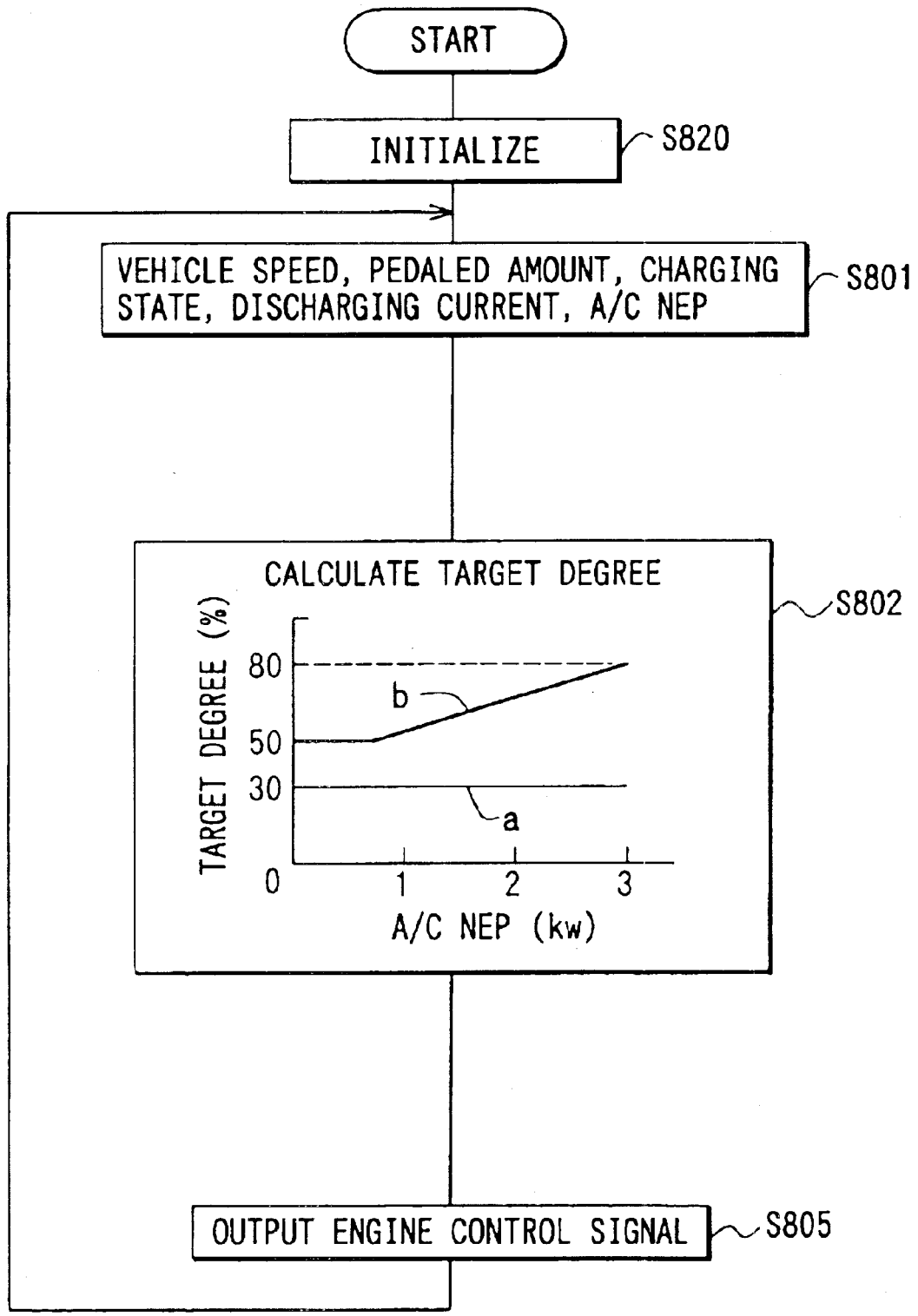
FIG. 15 is a flow diagram showing control processes of an air conditioner according to a ninth embodiment of the present invention.

The ninth embodiment of the present invention will be now described with reference to FIG. 15. The ninth embodiment is a modification of the above-described sixth and seventh embodiments. In the ninth embodiment, as shown in FIG. 15, step S803 is not provided as compared with the sixth and seventh embodiments. Specifically, at step S801 in FIG. 15, the running speed of the vehicle is calculated based on the signal from the vehicle speed sensor 77, the battery charging state (i.e., residual charging degree) of the battery 4 or a discharging current of the battery 4 is calculated, and a pedaled amount of the acceleration pedal is calculated. Further, the air-conditioning necessary electrical power A/C NEP is input at step S801 in FIG. 15. Then, operation of step S802 similar to step S802 in FIGS. 12 and 13 is performed. In the ninth embodiment, other parts are similar to those of the above-described sixth embodiment.

Although the present invention has been fully described in connection with preferred embodiments thereof with reference to the accompanying drawings, it is to be noted that various changes and modifications will become apparent to those skilled in the art.

For example, in the above-described embodiments of the present invention, the electrical compressor 41 is an integrated body where a compression mechanism is integrated to an electrical motor. However, only when the compression mechanism is driven by the electrical motor in the electrical compressor 41, the structure of the electrical compressor 41 can be suitably changed. For example, in the electrical compressor 41, the driving force generated in the electrical motor can be transmitted to the compression mechanism through a belt.

In the above-described embodiments of the present invention, cold capacity generated in the low-pressure side of the vapor-compression refrigerant cycle is used. However, in the above-described embodiments of the present invention, hot capacity generated in the high-pressure side of the vapor-compression refrigerant cycle can be used.

In the above-described embodiments of the present invention, the consumption power consumed in the air conditioner mainly includes the consumption power of the electrical compressor 41. However, when the air conditioner includes an electrical heater for heating air, the consumption power consumed in the air conditioner mainly includes the consumed power of the electrical compressor 41 and the consumed power of the electrical heater.

In the above-described embodiments of the present invention, the integrated electrical motor generator 2 having the electrical motor 2a for running the vehicle in supplementary and the power generator 2b for charging the battery 4 is integrally provided. However, an electrical motor 2a having the electrical motor function and a power generator 2b having the power generator function can be provided separately independently from each other.

Such changes and modifications are to be understood as being within the scope of the present invention as defined by the appended claims.

What is claimed is:

1. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:

an air conditioning unit, to which electrical power from the battery is supplied, for performing air-conditioning operation in a passenger compartment of the vehicle; and a control unit for controlling operation of the air conditioning unit, wherein:

when a residual charging degree of the battery becomes equal to or lower than a charging-starting target value, the electrical motor is driven by the engine to charge the battery; and when the battery is discharged, the control unit decreases an air-conditioning capacity of the air conditioning unit, as compared with a case where the battery is charged.

2. The air conditioner according to claim 1, wherein:

when an electrical power amount discharged from the battery is equal to or larger than a predetermined value, the control unit decreases the air-conditioning capacity of the air conditioning unit, as compared with a case where the electrical power amount discharged from the battery is smaller than the predetermined value.

3. The air conditioner according to claim 1, wherein:

when a running load of the vehicle is equal to or larger than a predetermined value, the control unit decreases the air-conditioning capacity of the air conditioning unit, as compared with a case where the running load of the vehicle is smaller than the predetermined value.

4. The air conditioner according to claim 1, wherein the control unit controls the air-conditioning capacity of the air conditioning unit, based on a power generation state of the power generator.

5. The air conditioner according to claim 1, wherein:

when the vehicle is in an acceleration state, the control unit decreases the air-conditioning capacity of the air conditioning unit, as compared with a case where the vehicle is in a deceleration state.

6. The air conditioner according to claim 1, wherein:

when a power generation efficiency due to the engine is equal to or lower than a predetermined efficiency, the control unit decreases the air-conditioning capacity of the air conditioning unit, as compared with a case where the power generation efficiency due to the engine is higher than the predetermined efficiency.

7. The air conditioner according to claim 1, wherein:

the air conditioning unit includes a vapor-compression refrigerant cycle that is operated in one of an economy mode where a capacity of the vapor-compression refrigerant cycle is restricted to be lower than a predetermined level, and a full mode that releases the economy mode; and the control unit forbids to decrease the air-conditioning capacity of the air conditioning unit, in any one mode of a large air-conditioning load mode where an air conditioning load is larger than a predetermined load, a defroster mode where air is blown toward a vehicle windshield, and the full mode.

8. The air conditioner according to claim 1 wherein:

the control unit calculates an air-conditioning necessary electrical power, required for the air conditioning unit for adjusting a temperature in the passenger compartment at a set temperature; and the control unit sets an electrical power used for the air conditioning unit at a predetermined value lower than the air-conditioning necessary electrical power, so that the air-conditioning capacity of the air conditioning unit is decreased.

9. The air conditioner according to claim 1, wherein:

the air conditioning unit includes a refrigerant cycle system in which refrigerant circulates; and the refrigerant cycle system includes an electrical compressor, operated using electrical power supplied from the electrical motor, for compressing refrigerant.

10. The air conditioner according to claim 1, wherein:

the control unit calculates an air-conditioning necessary electrical power, required for the air conditioning unit for adjusting a temperature in the passenger compartment at a set temperature; and the charging-starting target value is set larger as the air-conditioning necessary electrical power in a vehicle running becomes larger.

11. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:

an air conditioning unit, to which electrical power from the battery is supplied, for performing air-conditioning operation in a passenger compartment of the vehicle; and a control unit for controlling operation of the air conditioning unit, wherein:

when a residual charging degree of the battery becomes equal to or lower than a charging-starting target value, the electrical motor is driven by the engine to charge the battery; and when a running load of the vehicle is equal to or larger than a predetermined value, the control unit decreases the air-conditioning capacity of the air conditioning unit, as compared with a case where the running load of the vehicle is smaller than the predetermined value.

12. The air conditioner according to claim 11, wherein:

the air conditioning unit includes a vapor-compression refrigerant cycle that is operated in one of an economy mode where a capacity of the vapor-compression refrigerant cycle is restricted to be lower than a predetermined level, and a full mode that releases the economy mode; and the control unit forbids to decrease the air-conditioning capacity of the air conditioning unit, in any one mode of a large air-conditioning load mode where an air conditioning load is larger than a predetermined load, a defroster mode where air is blown toward a vehicle windshield, and the full mode.

13. The air conditioner according to claim 11, wherein:

the control unit calculates an air-conditioning necessary electrical power, required for the air conditioning unit for adjusting a temperature in the passenger compartment at a set temperature; and the control unit sets an electrical power used for the air conditioning unit at a predetermined value lower than the air-conditioning necessary electrical power, so that the air-conditioning capacity of the air conditioning unit is decreased.

14. The air conditioner according to claim 11, wherein:

the air conditioning unit includes a refrigerant cycle system in which refrigerant circulates; and the refrigerant cycle system includes an electrical compressor, operated using electrical power supplied from the electrical motor, for compressing refrigerant.

15. The air conditioner according to claim 11, wherein:

the control unit calculates an air-conditioning necessary electrical power, required for the air conditioning unit for adjusting a temperature in the passenger compartment at a set temperature; and the charging-starting target value is set larger as the air-conditioning necessary electrical power in a vehicle running becomes larger.

16. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:

an air conditioning unit, to which electrical power from the battery is supplied, for performing air-conditioning operation in a passenger compartment of the vehicle; and a control unit for controlling operation of the air, conditioning unit, wherein:

when a residual charging degree of the battery becomes equal to or lower than a charging-starting target value, the electrical motor is driven by the engine to charge the battery; and the control unit controls an air-conditioning capacity of the air conditioning unit, based on a power generation state of the power generator.

17. The air conditioner according to claim 16, wherein:

the air conditioning unit includes a vapor-compression refrigerant cycle that is operated in one of an economy mode where a capacity of the vapor-compression refrigerant cycle is restricted to be lower than a predetermined level, and a full mode that releases the economy mode; and the control unit forbids to decrease the air-conditioning capacity of the air conditioning unit, in any one mode of a large air-conditioning load mode where an air conditioning load is larger than a predetermined load, a defroster mode where air is blown toward a vehicle windshield, and the full mode.

18. The air conditioner according to claim 16, wherein:

the control unit calculates an air-conditioning necessary electrical power, required for the air conditioning unit for adjusting a temperature in the passenger compartment at a set temperature; and the control unit sets an electrical power used for the air conditioning unit at a predetermined value lower than the air-conditioning necessary electrical power, so that the air-conditioning capacity of the air conditioning unit is decreased.

19. The air conditioner according to claim 16, wherein:

the air conditioning unit includes a refrigerant cycle system in which refrigerant circulates; and the refrigerant cycle system includes an electrical compressor, operated using electrical power supplied from the electrical motor, for compressing refrigerant.

20. The air conditioner according to claim 16, wherein:

the control unit calculates an air-conditioning necessary electrical power, required for the air conditioning unit for adjusting a temperature in the passenger compartment at a set temperature; and the charging-starting target value is set larger as the air-conditioning necessary electrical power in a vehicle running becomes larger.

21. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:

an air conditioning unit, to which electrical power from the battery is supplied, for performing air-conditioning operation in a passenger compartment of the vehicle; and a control unit for controlling operation of the air conditioning unit, wherein:

when a residual charging degree of the battery becomes equal to or lower than a charging-starting target value, the electrical motor is driven by the engine to charge the battery; and when the vehicle is in an acceleration state, the control unit decreases the air-conditioning capacity of the air conditioning unit, as compared with a case where the vehicle is in a deceleration state.

22. The air conditioner according to claim 21, wherein:

the air conditioning unit includes a vapor-compression refrigerant cycle that is operated in one of an economy mode where a capacity of the vapor-compression refrigerant cycle is restricted to be lower than a predetermined level, and a full mode that releases the economy mode; and the control unit forbids to decrease the air-conditioning capacity of the air conditioning unit, in any one mode of a large air-conditioning load mode where an air conditioning load is larger than a predetermined load, a defroster mode where air is blown toward a vehicle windshield, and the full mode.

23. The air conditioner according to claim 21, wherein:
the control unit calculates an air-conditioning necessary electrical power, required for the air conditioning unit for adjusting a temperature in the passenger compartment at a set temperature; and
the control unit sets an electrical power used for the air conditioning unit at a predetermined value lower than the air-conditioning necessary electrical power, so that the air-conditioning capacity of the air conditioning unit is decreased.

24. The air conditioner according to claim 21, wherein:
the air conditioning unit includes a refrigerant cycle system in which refrigerant circulates; and
the refrigerant cycle system includes an electrical compressor, operated using electrical power supplied from the electrical motor, for compressing refrigerant.

25. The air conditioner according to claim 21, wherein:
the control unit calculates an air-conditioning necessary electrical power, required for the air conditioning unit for adjusting a temperature in the passenger compartment at a set temperature; and
the charging-starting target value is set larger as the air-conditioning necessary electrical power in a vehicle running becomes larger.

26. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:
an air conditioning unit, to which electrical power from the battery is supplied, for performing air-conditioning operation in a passenger compartment of the vehicle; and
a control unit for controlling operation of the air conditioning unit, wherein:
when a residual charging degree of the battery becomes equal to or lower than a charging-starting target value, the electrical motor is driven by the engine to charge the battery; and
when an electrical power amount discharged from the battery is equal to or larger than a predetermined value, the control unit decreases the air-conditioning capacity of the air conditioning unit, as compared with a case where the electrical power amount discharged from the battery is smaller than the predetermined value.

27. An air conditioner for a hybrid vehicle, the hybrid vehicle having an engine for running the vehicle, an electrical motor for supplementary running the vehicle, a battery for supplying electrical power to the electrical motor, and a power generator driven by the engine to generate electrical power and to charge the battery, the air conditioner comprising:
an air conditioning unit, to which electrical power from the battery is supplied, for performing air-conditioning operation in a passenger compartment of the vehicle; and
a control unit for controlling operation of the air conditioning unit, wherein:
when a residual charging degree of the battery becomes equal to or lower than a charging-starting target value, the electrical motor is driven by the engine to charge the battery; and
when a power generation efficiency due to the engine is equal to or lower than a predetermined efficiency, the control unit decreases the air-conditioning capacity of the air conditioning unit, as compared with a case where the power generation efficiency due to the engine is higher than the predetermined efficiency.

\* \* \* \* \*

UNITED STATES PATENT AND TRADEMARK OFFICE
CERTIFICATE OF CORRECTION

PATENT NO.    : 6,840,055 B2
DATED         : January 11, 2005
INVENTOR(S)   : Kunio Iritani It is certified that error appears in the above-identified patent and that said Letters Patent is hereby corrected as shown below:

Title page,
Item [30], Foreign Application Priority Data, "Oct. 2, 2002  (JP)   2002-306913" should be -- Oct. 22, 2002  (JP)   2002-306913 --

Signed and Sealed this

Tenth Day of May, 2005

JON W. DUDAS
*Director of the United States Patent and Trademark Office*